US012752235B2

(12) United States Patent
Sugiura et al.

(10) Patent No.: US 12,752,235 B2
(45) Date of Patent: Oct. 6, 2026

(54) $CO_2$ RECOVERY SYSTEM AND $CO_2$ RECOVERY METHOD

(71) Applicant: MITSUBISHI HEAVY INDUSTRIES, LTD., Tokyo (JP)

(72) Inventors: Takuya Sugiura, Tokyo (JP); Tatsuya Tsujiuchi, Tokyo (JP); Takuya Hirata, Tokyo (JP); Hiroshi Tanaka, Tokyo (JP); Junji Imada, Tokyo (JP); Yoshitaka Shindo, Tokyo (JP); Takuichiro Daimaru, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 390 days.

(21) Appl. No.: 18/702,579

(22) PCT Filed: Oct. 18, 2022

(86) PCT No.: PCT/JP2022/038810

§ 371 (c)(1),
(2) Date: Apr. 18, 2024

(87) PCT Pub. No.: WO2023/068280

PCT Pub. Date: Apr. 27, 2023

(65) Prior Publication Data

US 2024/0416274 A1 Dec. 19, 2024

(30) Foreign Application Priority Data

Oct. 21, 2021 (JP) ................................ 2021-172643

(51) Int. Cl.
*B01D 53/14* (2006.01)
*B01D 53/18* (2006.01)
(Continued)

(52) U.S. Cl.
CPC ......... *B01D 53/18* (2013.01); *B01D 53/1412* (2013.01); *B01D 53/1418* (2013.01);
(Continued)

(58) Field of Classification Search
CPC ........................... B01D 53/18; B01D 53/1412; B01D 53/1418; B01D 53/1475; B01D 53/62;
(Continued)

(56) References Cited

U.S. PATENT DOCUMENTS 9,421,491 B2 8/2016 Tsujiuchi et al.
2002/0006371 A1* 1/2002 Watson ............... B01D 53/526 423/220
(Continued)

FOREIGN PATENT DOCUMENTS

AU 2012203408 A1 6/2012
JP 2014-042904 A 3/2014
(Continued)

OTHER PUBLICATIONS

Extended European Search Report issued in corresponding European Patent Application No. 22883584.9 mailed Jun. 5, 2025 (10 pages).

*Primary Examiner* — Frank M Lawrence, Jr.
(74) *Attorney, Agent, or Firm* — Osha Bergman Watanabe & Burton LLP

(57) ABSTRACT

A $CO_2$ recovery system includes: a combustion facility; a $CO_2$ absorption tower that brings an exhaust gas containing $CO_2$, which is discharged from the combustion facility and introduced into the $CO_2$ absorption tower, into contact with a $CO_2$ absorption liquid to remove the $CO_2$ from the exhaust gas; and a decarbonated gas introduction line that is connected to the $CO_2$ absorption tower and the combustion facility and allows at least a portion of a decarbonated gas, which is the exhaust gas from which the $CO_2$ has been
(Continued)

removed in the $CO_2$ absorption tower, to be introduced into the combustion facility.

23 Claims, 13 Drawing Sheets

(51) Int. Cl.
*B01D 53/62* (2006.01)
*B01D 53/78* (2006.01)

(52) U.S. Cl.
CPC ......... *B01D 53/1475* (2013.01); *B01D 53/62* (2013.01); *B01D 53/78* (2013.01); *B01D 2252/204* (2013.01); *B01D 2257/504* (2013.01); *B01D 2258/0283* (2013.01)

(58) Field of Classification Search
CPC .............. B01D 53/78; B01D 2252/204; B01D 2257/504; B01D 2258/0283; B01D 51/10; B01D 53/1431; B01D 53/50; B01D 53/14; C01B 32/50; Y02C 20/40
USPC ............ 95/204, 227–229, 236; 96/242, 243; 423/220, 228, 229
See application file for complete search history.

(56) References Cited

U.S. PATENT DOCUMENTS

| | | | | |
|---|---|---|---|---|
| 2012/0318141 | A1* | 12/2012 | Tsujiuchi ........... | B01D 53/1475 96/242 |
| 2014/0150653 | A1 | 6/2014 | Tsujiuchi et al. | |
| 2017/0120186 | A1 | 5/2017 | Häfner et al. | |
| 2019/0232215 | A1* | 8/2019 | Fujita ................. | B01D 53/1475 |

FOREIGN PATENT DOCUMENTS

| | | | |
|---|---|---|---|
| JP | 6811759 | B2 | 1/2021 |
| WO | 2013/039040 | A1 | 3/2013 |

* cited by examiner

$CO_2$ RECOVERY SYSTEM AND $CO_2$ RECOVERY METHOD

TECHNICAL FIELD

Priority is claimed on Japanese Patent Application No. 2021-172643, filed on Oct. 21, 2021, the content of which is incorporated herein by reference.

The present disclosure relates to a $CO_2$ recovery system and a $CO_2$ recovery method.

BACKGROUND ART

Various methods have been proposed for a method of recovering and removing an acidic gas, particularly $CO_2$, contained in a flue gas from a boiler, for example. For example, PTL 1 describes a method of removing and recovering $CO_2$ in an exhaust gas discharged from a combustion facility or the like by bringing the $CO_2$ into contact with a $CO_2$ absorption liquid using, for example, an amine aqueous solution.

CITATION LIST

Patent Literature

[PTL 1] Japanese Patent No. 6811759

SUMMARY OF INVENTION

Technical Problem

In a system for recovering $CO_2$ from the exhaust gas as described above, there is a concern that a portion of a component of the $CO_2$ absorption liquid may remain in a decarbonated gas, which is the exhaust gas from which the $CO_2$ has been removed, and the component of the $CO_2$ absorption liquid may be discharged to an outside of the system together with the decarbonated gas. Therefore, it is required to suppress the discharge of the component of the $CO_2$ absorption liquid to the outside of the system.

The present disclosure has been made to solve the above-described problem, and an object of the present disclosure is to provide a $CO_2$ recovery system and a $CO_2$ recovery method capable of suppressing discharge of a component of a $CO_2$ absorption liquid to an outside of a system.

Solution to Problem

In order to solve the above-described problem and achieve the object, according to the present disclosure, there is provided a $CO_2$ recovery system including: a combustion facility; a $CO_2$ absorption tower that brings an exhaust gas containing $CO_2$, which is discharged from the combustion facility and introduced into the $CO_2$ absorption tower, into contact with a $CO_2$ absorption liquid to remove the $CO_2$ from the exhaust gas; and a decarbonated gas introduction line that is connected to the $CO_2$ absorption tower and the combustion facility and allows at least a portion of a decarbonated gas, which is the exhaust gas from which the $CO_2$ has been removed in the $CO_2$ absorption tower, to be introduced into the combustion facility.

In order to solve the above-described problem and achieve the object, according to the present disclosure, there is provided a $CO_2$ recovery method including: a step of generating an exhaust gas containing $CO_2$ by combusting in a combustion facility; a step of bringing the exhaust gas discharged from the combustion facility into contact with a $CO_2$ absorption liquid to remove the $CO_2$ from the exhaust gas; and a step of introducing at least a portion of a decarbonated gas, which is the exhaust gas from which the $CO_2$ has been removed, into the combustion facility.

Advantageous Effects of Invention

According to the present disclosure, it is possible to suppress discharge of a component of a $CO_2$ absorption liquid to an outside of a system.

DESCRIPTION OF EMBODIMENTS

Hereinafter, a preferred embodiment of the present invention will be described in detail with reference to the accompanying drawings. The present invention is not limited by the embodiment, and in a case where there are a plurality of the embodiments, the present invention also includes configurations in which the respective embodiments are combined with each other.

First Embodiment

Figure 1:
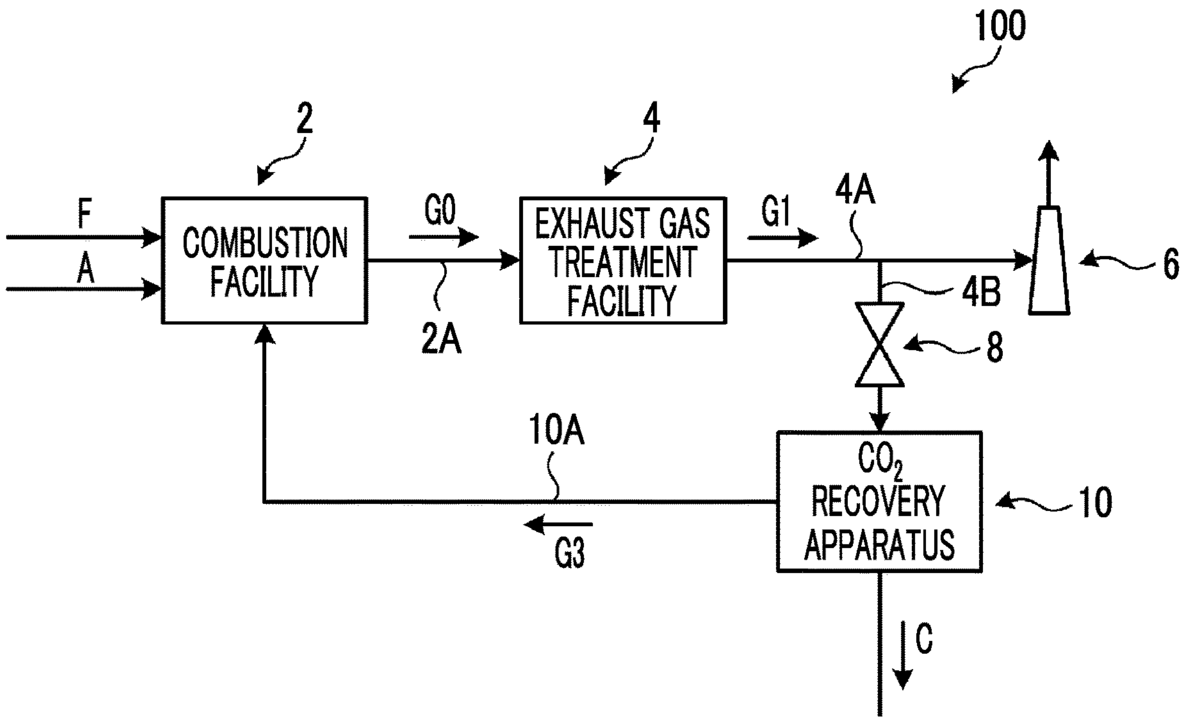
FIG. 1 is a schematic block diagram of a $CO_2$ recovery system according to a first embodiment.

FIG. 1 is a schematic block diagram of a $CO_2$ recovery system according to a first embodiment. As shown in FIG. 1, a $CO_2$ recovery system 100 according to the first embodiment includes a combustion facility 2, an exhaust gas treatment facility 4, a chimney 6, an adjustment unit 8, and a $CO_2$ recovery apparatus 10.

(Combustion Facility)

The combustion facility 2 is a facility that receives introduced fuel F and air A and combusts the fuel F. An exhaust gas G0 generated by combustion is discharged from the combustion facility 2. The exhaust gas G0 is a gas containing $CO_2$. The fuel F may be any fuel, and examples thereof include coal, natural gas, waste, biogas, blast furnace gas, and coke oven gas. The combustion facility 2 may be any facility as long as the fuel F is combusted.

(Exhaust Gas Treatment Facility)

The exhaust gas treatment facility 4 is a facility that treats the exhaust gas G0 discharged from the combustion facility 2. The exhaust gas treatment facility 4 is connected to the combustion facility 2 via a discharge line 2A. The exhaust gas G0 discharged from the combustion facility 2 is introduced into the exhaust gas treatment facility 4 through the discharge line 2A and is treated in the exhaust gas treatment facility 4. The exhaust gas treatment facility 4 may be a facility that performs any treatment on the exhaust gas G0. For example, the exhaust gas treatment facility 4 may include at least one of a temperature-reducing tower that cools the exhaust gas G0 and a dust collector that recovers dust contained in the exhaust gas G0. For example, the temperature-reducing tower may cool the exhaust gas G0 by spraying cooling water to the exhaust gas G0, and for example, the dust collector may recover the dust by filtering the exhaust gas G0 with a filter. Since the recovery of the $CO_2$ from the exhaust gas G0 is performed by the $CO_2$ recovery apparatus 10, the exhaust gas treatment facility 4 in the present embodiment may perform a process other than recovering the $CO_2$ from the exhaust gas G0. The exhaust gas treatment facility 4 is not an essential configuration and may not be included in the $CO_2$ recovery system 100.

(Chimney)

The chimney 6 is a tower (for example, a chimney) that discharges an exhaust gas G1 treated by the exhaust gas treatment facility 4. The chimney 6 is connected to the exhaust gas treatment facility 4 via a discharge line 4A.

The $CO_2$ recovery system 100 may be provided with a power generation facility that generates power by using the exhaust gas as a power source. The power generation facility may be provided, for example, between the combustion facility 2 and the exhaust gas treatment facility 4.

($CO_2$ Recovery Apparatus)

The $CO_2$ recovery apparatus 10 is an apparatus that recovers $CO_2$ from the exhaust gas G0 discharged from the combustion facility 2. More specifically, the $CO_2$ recovery apparatus 10 brings the exhaust gas G0, which is discharged from the combustion facility 2 and introduced into the $CO_2$ recovery apparatus 10, into contact with a $CO_2$ absorption liquid S1 to remove the $CO_2$ from the exhaust gas G0. The $CO_2$ recovery apparatus 10 is connected to the combustion facility 2 via an exhaust gas introduction line 4B. In the present embodiment, the exhaust gas introduction line 4B is branched from the discharge line 4A and is connected to the discharge line 4A and the $CO_2$ recovery apparatus 10. That is, in the present embodiment, it can be said that the $CO_2$ recovery apparatus 10 is connected to the exhaust gas treatment facility 4 via the exhaust gas introduction line 4B. Therefore, the exhaust gas G1 that has been treated by the exhaust gas treatment facility 4 is introduced into the $CO_2$ recovery apparatus 10.

The exhaust gas introduction line 4B is provided with the adjustment unit 8 that adjusts a flow rate of the exhaust gas G1 to be introduced into the $CO_2$ recovery apparatus 10. The adjustment unit 8 is an openable/closable valve in the present embodiment, and introduces the exhaust gas G1 into the $CO_2$ recovery apparatus 10 in an opened state and stops the introduction of the exhaust gas G1 into the $CO_2$ recovery apparatus 10 in a closed state. In addition, the adjustment unit 8 can adjust the flow rate of the exhaust gas G1 to be introduced into the $CO_2$ recovery apparatus 10 by adjusting the opening degree thereof. The adjustment unit 8 may be controlled by a control device 50, which will be described below. The adjustment unit 8 is not limited to the valve and may be any mechanism capable of adjusting the flow rate of the exhaust gas G1. In addition, the adjustment unit 8 is not an essential configuration and may not be included in the $CO_2$ recovery system 100.

Figure 2:
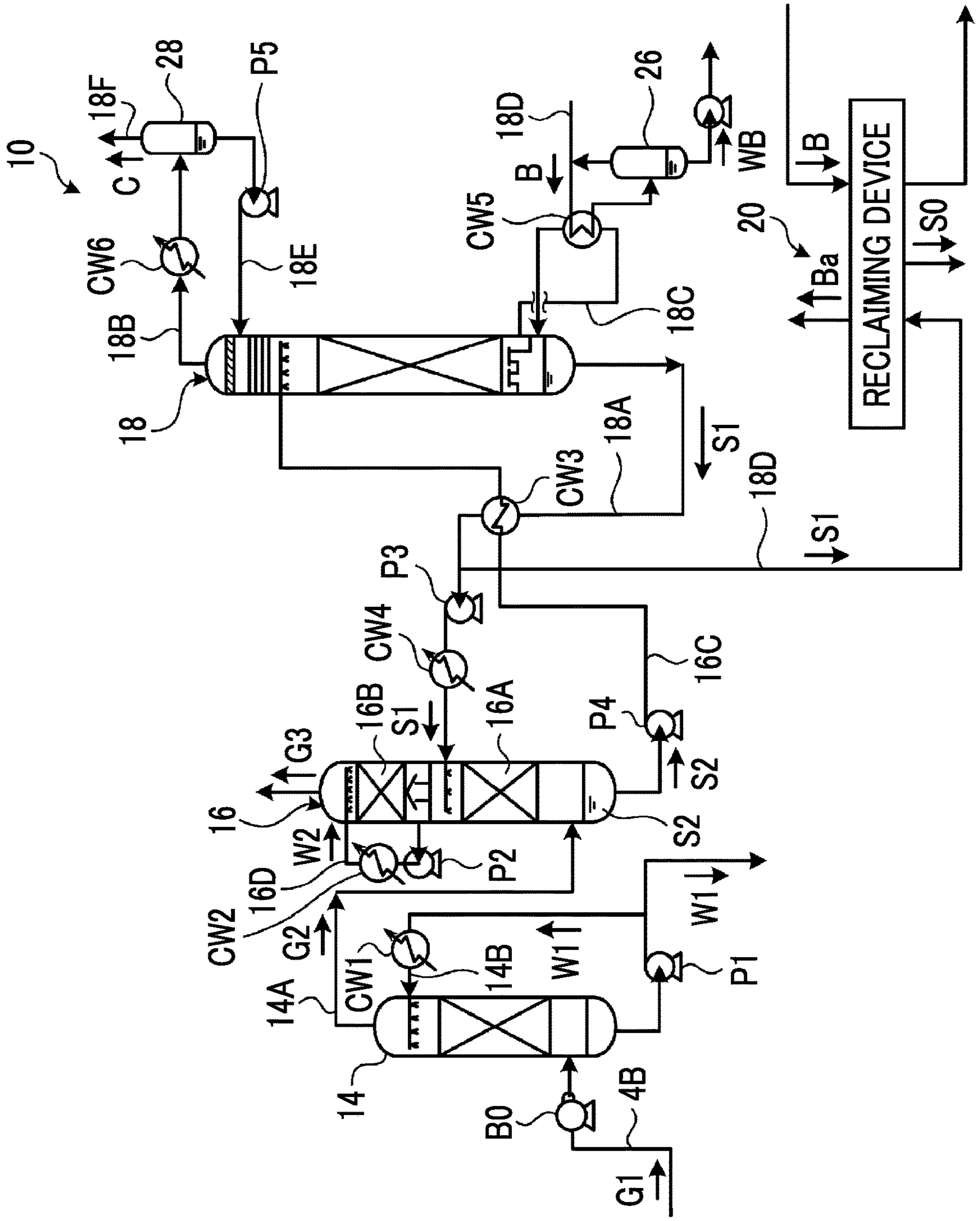
FIG. 2 is a schematic diagram of a $CO_2$ recovery apparatus according to the first embodiment.

The $CO_2$ recovery apparatus 10 will be described in detail. FIG. 2 is a schematic diagram of the $CO_2$ recovery apparatus according to the first embodiment. As shown in FIG. 2, the $CO_2$ recovery apparatus 10 includes an exhaust gas cooling device 14, a $CO_2$ absorption tower 16, a regeneration tower 18, and a reclaiming device 20.

(Exhaust Gas Cooling Device)

The exhaust gas cooling device 14 is a device that cools the exhaust gas G1 by using cooling water W1, and may be called an exhaust gas cooling tower. The exhaust gas cooling device 14 is connected to the exhaust gas introduction line 4B, and the exhaust gas G0 (the exhaust gas G1 treated by the exhaust gas treatment facility 4, in the present embodiment) discharged from the combustion facility 2 is introduced from the exhaust gas introduction line 4B. In the present embodiment, a blower B0 is disposed on the exhaust gas introduction line 4B, and the exhaust gas G1 boosted by the blower B0 is introduced into the exhaust gas cooling device 14.

A cooled exhaust gas introduction line 14A and a cooling line 14B are connected to the exhaust gas cooling device 14. The cooling line 14B is a pipe for circulating the cooling water W1 into the exhaust gas cooling device 14. The cooling line 14B is provided with a pump P1 and a cooler CW1. In the present embodiment, the cooling water W1 is circulated by driving the pump P1. In the cooling line 14B, the cooling water W1 is cooled by the cooler CW1, and then is supplied into the exhaust gas cooling device 14 to come into contact with the exhaust gas G1 introduced into the exhaust gas cooling device 14, thereby cooling the exhaust gas G1 to a predetermined temperature. The cooling water W1 that has cooled the exhaust gas G1 inside the exhaust gas cooling device 14 is returned from the exhaust gas cooling device 14 to the cooling line 14B.

($CO_2$ Absorption Tower)

The $CO_2$ absorption tower 16 is a facility that brings the exhaust gas into contact with the $CO_2$ absorption liquid S1 to remove the $CO_2$ from the exhaust gas. The $CO_2$ absorption tower 16 is provided at a downstream stage of the exhaust gas cooling device 14 in a flow direction of the exhaust gas G. The $CO_2$ absorption tower 16 is connected to the exhaust gas cooling device 14 via the cooled exhaust gas introduction line 14A. An exhaust gas G2, which is the exhaust gas G1 cooled by the exhaust gas cooling device 14, is introduced into the $CO_2$ absorption tower 16 through the cooled exhaust gas introduction line 14A. That is, in the present embodiment, the $CO_2$ absorption tower 16 removes the $CO_2$ from the exhaust gas G2 cooled by the exhaust gas cooling device 14.

The $CO_2$ absorption tower 16 includes a $CO_2$ recovery section 16A and a washing section 16B. In the $CO_2$ recovery section 16A, the $CO_2$ in the exhaust gas G2 is removed by the $CO_2$ absorption liquid S1. In the $CO_2$ recovery section 16A, the $CO_2$ absorption liquid S1 is supplied, so that the exhaust gas G2 passing through the $CO_2$ recovery section 16A comes into countercurrent contact with the $CO_2$ absorption liquid S1. The $CO_2$ in the exhaust gas G2 is absorbed by the $CO_2$ absorption liquid S1 through a chemical reaction. A decarbonated gas G3, which is the exhaust gas G2 from which the $CO_2$ has been removed in the $CO_2$ recovery section 16A, is washed with a rinse liquid W2 in the washing section 16B installed above the gas flow downstream side of the $CO_2$ recovery section 16A. In the washing section 16B, the rinse liquid W2 supplied from a nozzle comes into gas-liquid contact with the decarbonated gas G3, and the $CO_2$ absorption liquid S1 (a component of the $CO_2$ absorption liquid S1) entrained in the decarbonated gas G3 is recovered. More specifically, in the washing section 16B, a rinse water circulation line 16D is connected, and the rinse liquid W2 is circulated by a pump P2 disposed on the rinse water circulation line 16D. Then, the rinse liquid W2 is cooled by a cooler CW2 disposed on the rinse water circulation line 16D and is supplied into the washing section 16B to wash the passing decarbonated gas G3 while cooling the decarbonated gas G3 to a predetermined temperature. In this way, the mist-like $CO_2$ absorption liquid S1 (the component of the $CO_2$ absorption liquid S1) entrained in the decarbonated gas G3 is washed with the rinse liquid W2 in the washing section 16B, so that the discharge of the $CO_2$ absorption liquid entrained in the decarbonated gas G3 is prevented, thereby reducing the emission. The temperature at which the decarbonated gas G3 is cooled may be substantially the same as the introduction temperature at which the exhaust gas G2 is introduced into the $CO_2$ absorption tower 16, and this maintains the water balance within the system. For example, in a case where the moisture amount in the exhaust gas G2 to be introduced into the $CO_2$ absorption tower 16 is 10 wt %, the cooling temperature may be adjusted such that the moisture amount in the decarbonated gas G3 to be discharged from the top of the $CO_2$ absorption tower 16 is also 10 wt %.

The $CO_2$ absorption liquid S1 is not particularly limited, and examples thereof include amine compounds such as alkanolamines or hindered amines having an alcoholic hydroxyl group. Examples of such alkanolamines include monoethanolamine, diethanolamine, triethanolamine, methyldiethanolamine, diisopropanolamine, and diglycolamine, and monoethanolamine (MEA) is generally preferable. In addition, examples of the hindered amines having an alcoholic hydroxyl group include 2-amino-2-methyl-1-propanol (AMP), 2-(ethylamino)-ethanol (EAE), 2-(methylamino)-ethanol (MAE), and 2-(diethylamino)-ethanol (DEAE).

A rich solution S2, which is the $CO_2$ absorption liquid S1 that has absorbed the $CO_2$ in the exhaust gas G2, is stored in a bottom portion of the $CO_2$ absorption tower 16. A rich solution introduction line 16C through which the rich solution S2 is discharged from the bottom portion of the $CO_2$ absorption tower 16 and the rich solution S2 is introduced into a regeneration tower 18 side, and a lean solution introduction line 18A through which the $CO_2$ absorption liquid S1 (lean solution) is discharged from a bottom portion of the regeneration tower 18 and is introduced into a $CO_2$ absorption tower 16 side intersect each other and are connected to the $CO_2$ absorption tower 16 and the regeneration tower 18. Then, a heat exchanger CW3 is disposed at an intersection of the rich solution introduction line 16C and the lean solution introduction line 18A. In the heat exchanger CW3, the rich solution S2 is heated by the $CO_2$ absorption liquid S1 (lean solution) regenerated by the regeneration tower 18 and is supplied to the regeneration tower 18. In addition, a pump P3 that boosts the $CO_2$ absorption liquid S1 (lean solution) and a cooler CW4 that cools the $CO_2$ absorption liquid S1 (lean solution) using cooling water are disposed between the heat exchanger CW3 and the $CO_2$ absorption tower 16, and the $CO_2$ absorption liquid S1 (lean solution) regenerated by the regeneration tower 18 is supplied into the $CO_2$ absorption tower 16 after being boosted and cooled through the lean solution introduction line 18A.

(Regeneration Tower)

The regeneration tower 18 absorbs $CO_2$ from the rich solution S2 that has absorbed the $CO_2$ in the exhaust gas G2 in the $CO_2$ absorption tower 16, and regenerates the $CO_2$ absorption liquid S1. A reboiler CW5 disposed on a reboiler line 18C is provided on a bottom portion side of the regeneration tower 18. In the reboiler CW5, when a portion of the $CO_2$ absorption liquid S1 (lean solution) is circulated through the reboiler line 18C, a portion of the $CO_2$ absorption liquid S1 (lean solution) is indirectly heated by saturated steam B, and the steam is introduced into the inside of the regeneration tower 18. The reboiler CW5 is provided with a saturated steam introduction line 18D for introducing the saturated steam B. A separation drum 26 is disposed on the saturated steam introduction line 18D and separates a condensed steam water WB.

The rich solution S2 generated in the $CO_2$ absorption tower 16 is introduced into the regeneration tower 18 from the rich solution introduction line 16C. A boost pump P4 is disposed on the rich solution introduction line 16C, and the rich solution S2 is boosted by the boost pump P4, heated by the heat exchanger CW3 using the $CO_2$ absorption liquid S1 (lean solution) regenerated by the regeneration tower 18, and supplied to the regeneration tower 18. The rich solution S2 released from an upper portion side of a side surface to the inside of the regeneration tower 18 is subjected to an endothermic reaction by the steam supplied from the bottom portion side, and most of the $CO_2$ is desorbed and released. The $CO_2$ absorption liquid that has released a portion or most of the $CO_2$ in the regeneration tower 18 is referred to as a semi-lean solution. By the time the semi-lean solution reaches the bottom portion of the regeneration tower 18, the semi-lean solution becomes the $CO_2$ absorption liquid S1 (lean solution) in which nearly all the $CO_2$ has been removed. A portion of the $CO_2$ absorption liquid S1 (lean solution) is heated by the reboiler CW5 using the saturated steam B, and the steam for $CO_2$ desorption is supplied to the inside of the regeneration tower 18.

Meanwhile, a gas discharge line 18B for discharging a $CO_2$-entrained gas accompanying the steam released from the rich solution S2 and the semi-lean solution in the tower is connected to the top of the regeneration tower 18. The gas discharge line 18B is provided with a cooler CW6 that cools the $CO_2$-entrained gas accompanying the steam, and a reflux water drum 28 that flashes the cooled $CO_2$-entrained gas to perform gas-liquid separation. The reflux water separated and recirculated from the $CO_2$-entrained gas accompanying the steam in the reflux water drum 28 is supplied to the upper portion of the regeneration tower 18 by a reflux water circulation pump P5 disposed on a reflux water line 18E.

A separated gas discharge line 18F for discharging a $CO_2$ gas C, which is the $CO_2$-entrained gas from which the reflux water is separated, is connected to the top of the reflux water drum 28. The $CO_2$ gas C discharged through the separated gas discharge line 18F is, for example, compressed and recovered. The $CO_2$ gas C is sent to a use destination, and for example, may be used for the cultivation of plants in a plant factory, may be used for chemical synthesis or the like, may be injected into an oil field by using an enhanced oil recovery (EOR), or may be stored in an aquifer.

(Reclaiming Device)

The reclaiming device 20 is, for example, a separation device that concentrates impurities through heating. The reclaiming device 20 is connected to the lean solution introduction line 18A for supplying the $CO_2$ absorption liquid S1 (lean solution) regenerated in the regeneration tower 18 via a branch line 18E. The reclaiming device 20 extracts a portion of the $CO_2$ absorption liquid S1 (lean solution) from the lean solution introduction line 18A via the branch line 18E, and introduces and stores the extracted $CO_2$ absorption liquid S1. The reclaiming device 20 heats the $CO_2$ absorption liquid S1 with steam B to return an absorbent vaporized from the $CO_2$ absorption liquid S1 as recovery steam B to the bottom portion side of the regeneration tower 18 while discharging an impurity S0, which is a residue concentrated through the heating. The impurity S0 contains a liquid component in the $CO_2$ absorption liquid S1 (liquid components including an absorbent, an alkaline agent, supply water that cannot be recovered, a liquid component of a non-volatile substance, and the like) and a solid component of a non-volatile component. The reclaiming device 20 is not an essential configuration.

The $CO_2$ recovery apparatus 10 has the above-described configuration.

(Introduction of Decarbonated Gas into Combustion Facility)

Since the decarbonated gas G3 in which $CO_2$ has been removed in the $CO_2$ absorption tower 16 is washed in the washing section 16B, the component of the $CO_2$ absorption liquid S1 entrained in the decarbonated gas G3 is removed, so that the discharge of the component of the $CO_2$ absorption liquid S1 to the outside is suppressed. However, since a portion of the component of the $CO_2$ absorption liquid S1 may remain in the decarbonated gas G3 even in a case where the decarbonated gas G3 is washed in the washing section 16B, it is required to more appropriately suppress the discharge of the component of the $CO_2$ absorption liquid S1. In that respect, in the $CO_2$ recovery system 100 according to the present embodiment, as shown in FIG. 1, the decarbonated gas G3 containing the component of the $CO_2$ absorption liquid S1 is introduced into the combustion facility 2, and the decarbonated gas G3 is combusted in the combustion facility 2. As a result, the $CO_2$ absorption liquid S1 (the component of the $CO_2$ absorption liquid S1) entrained in the decarbonated gas G3 is combusted and decomposed, so that it is possible to appropriately suppress the discharge of the component of the $CO_2$ absorption liquid S1 to the outside. As described in the present embodiment, it is preferable that the decarbonated gas G3 is washed in the washing section 16B and the discharge of the absorption liquid to the outside is suppressed. However, since the $CO_2$ absorption liquid S1 can be decomposed by combusting the decarbonated gas G3 in the combustion facility 2 even in a case where the decarbonated gas G3 is not washed in the washing section 16B, the washing of the decarbonated gas G3 in the washing section 16B is not essential.

Figure 3:
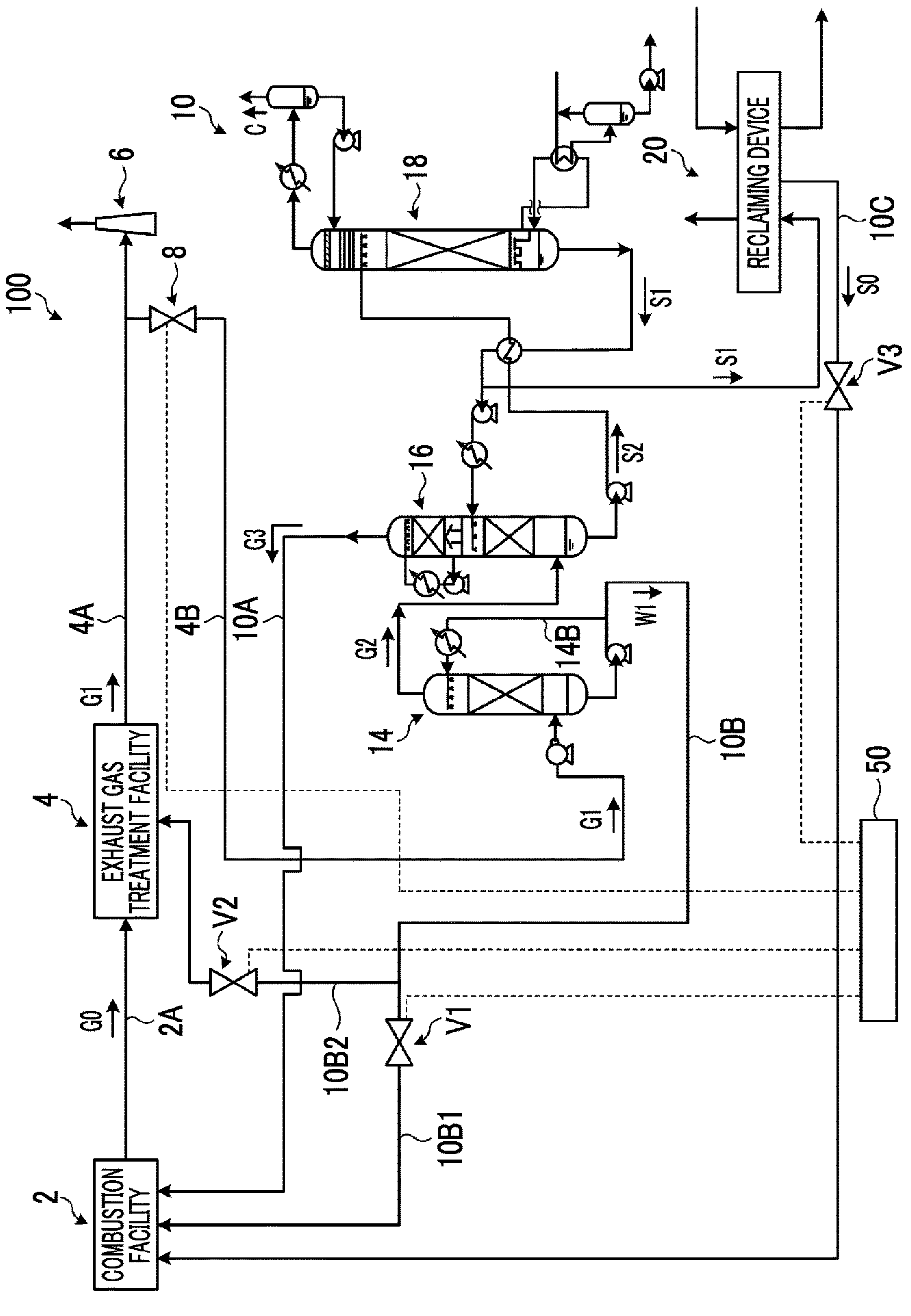
FIG. 3 is a schematic block diagram of the $CO_2$ recovery system according to the first embodiment.

A configuration for introducing the decarbonated gas G3 into the combustion facility 2 will be described in detail. FIG. 3 is a schematic block diagram of the $CO_2$ recovery system according to the first embodiment. As shown in FIG. 3, the $CO_2$ absorption tower 16 and the combustion facility 2 are connected to each other by a decarbonated gas introduction line 10A. In the example of the present embodiment, the decarbonated gas introduction line 10A is connected to the top of the $CO_2$ absorption tower 16. The decarbonated gas G3 in which the $CO_2$ has been removed in the $CO_2$ absorption tower 16 is introduced from the $CO_2$ absorption tower 16 into the decarbonated gas introduction line 10A. The decarbonated gas introduction line 10A is connected to a location where the combustion of the combustion facility 2 occurs. The decarbonated gas G3 introduced from the $CO_2$ absorption tower 16 into the decarbonated gas introduction line 10A is introduced from the decarbonated gas introduction line 10A into the combustion facility 2 and is combusted in the combustion facility 2.

The $CO_2$ recovery system 100 may include the control device 50 that controls the flow rate or the like of the exhaust gas G1 to be introduced into the $CO_2$ recovery apparatus 10. The control device 50 may be, for example, a computer including an arithmetic circuit such as a central processing unit (CPU). The control device 50 reads a program (software) from a storage unit (not shown) and executes control of each unit of the $CO_2$ recovery system 100, such as the control of the flow rate of the exhaust gas G1. In the present embodiment, the control device 50 controls the adjustment unit 8 to control the flow rate of the exhaust gas G1 to be introduced into the $CO_2$ recovery apparatus 10 through the adjustment unit 8. The control device 50 may adjust the flow rate of the exhaust gas G1 to be introduced into the $CO_2$ recovery apparatus 10, for example, according to the combustion state in the combustion facility 2. The combustion state herein indicates the degree of combustion in the combustion facility 2 and may be, for example, a combustion amount, a combustion temperature, or the like. In this case, the control device 50 may increase the flow rate of the exhaust gas G1 to be introduced into the $CO_2$ recovery apparatus 10 as the combustion amount in the combustion facility 2 increases (for example, as the amount of heat generated per unit amount of the fuel F increases).

In the example of the present embodiment, the entire amount of the decarbonated gas G3 inside the $CO_2$ absorption tower 16 is introduced into the combustion facility 2 through the decarbonated gas introduction line 10A. However, the present disclosure is not limited thereto, and at least a portion of the decarbonated gas G3 inside the $CO_2$ absorption tower 16 need only be introduced from the decarbonated gas introduction line 10A to the combustion facility 2. In this case, the flow rate of the decarbonated gas G3 to be introduced into the combustion facility 2 may be adjusted, for example, by providing an opening-closing valve on the decarbonated gas introduction line 10A and controlling the opening-closing valve through the control device 50.

Figure 4:
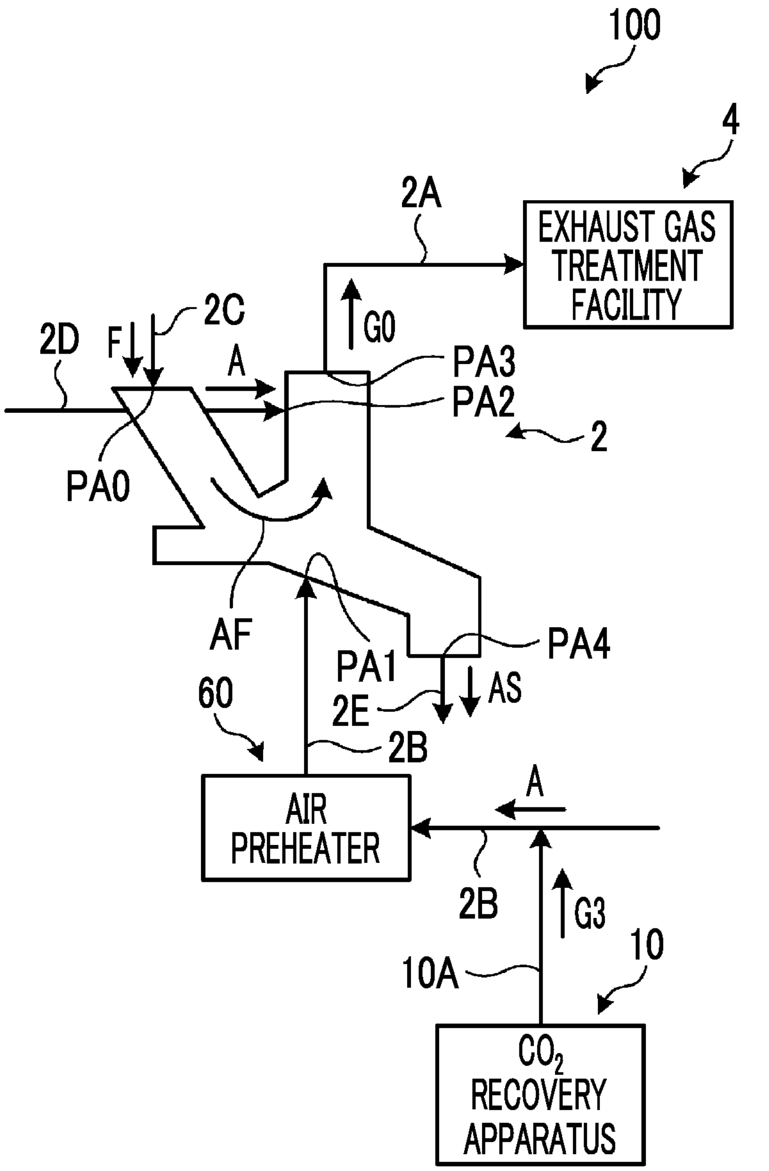
FIG. 4 is a schematic diagram illustrating an example of a connection position of a decarbonated gas introduction line in a combustion facility.
Figure 5:
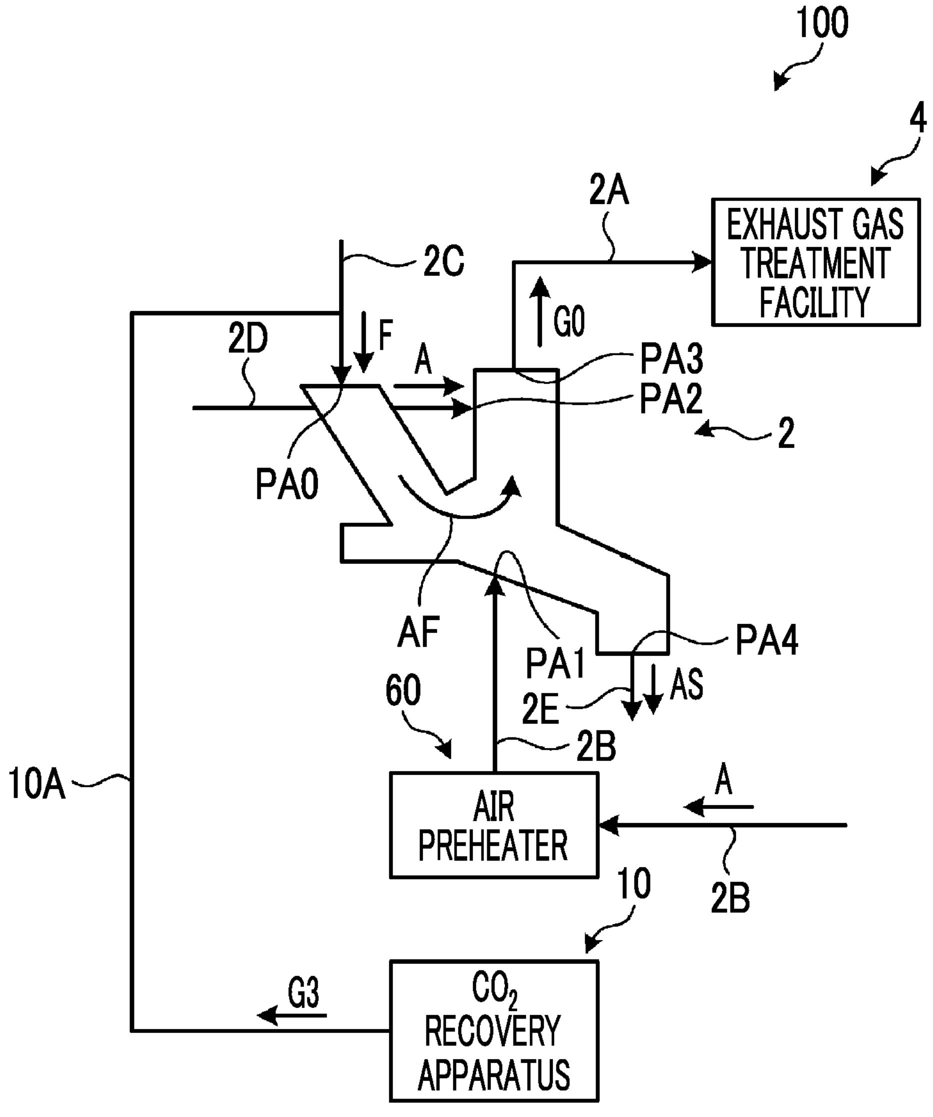
FIG. 5 is a schematic diagram illustrating an example of the connection position of the decarbonated gas introduction line in the combustion facility.

The decarbonated gas introduction line 10A may be connected to any position of the combustion facility 2, but an example of a connection position will be described below. FIGS. 4 and 5 are schematic diagrams illustrating examples of the connection positions of the decarbonated gas introduction line in the combustion facility. As shown in FIG. 4, for example, in the combustion facility 2, a fuel introduction inlet PA0 into which the fuel F is introduced, a first air introduction inlet PA1 into which the air A is introduced, a second air introduction inlet PA2 into which the air A is introduced, an exhaust gas discharge port PA3 through which the exhaust gas G0 is discharged, and an incineration ash PA4 through which discharge port incineration ash AS is discharged are formed. The first air introduction is connected to an air introduction line 2B, and the air A is introduced from the air introduction line 2B into the combustion facility 2 through the first air introduction inlet PA1. The air introduction line 2B may be provided with an air preheater 60 that heats the air A, and the air A heated by the air preheater 60 may be introduced into the combustion facility 2. The fuel introduction inlet PA0 is formed upstream of the first air introduction inlet PA1 in the combustion facility 2, in a gas flow direction AF within the combustion facility 2. The fuel introduction inlet PA0 is connected to a fuel introduction line 2C, and the fuel F is introduced from the fuel introduction line 2C into the combustion facility 2 through the fuel introduction inlet PA0. The second air introduction inlet PA2 is formed downstream of the fuel introduction inlet PA0 and the first air introduction inlet PA1 in the combustion facility 2, in the gas flow direction AF within the combustion facility 2. The second air introduction inlet PA2 is connected to an air introduction line 2D, and the air A is introduced from the air introduction line 2D into the combustion facility 2 through the second air introduction inlet PA2. That is, in the combustion facility 2, primary air is introduced from the first air introduction inlet PA1, and secondary air is introduced from the second air introduction inlet PA2. The air introduced from the first air introduction inlet PA1 and the second air introduction inlet PA2 and the fuel F introduced from the fuel introduction inlet PA0 are mixed and combusted in the combustion facility 2. The exhaust gas G0 generated by the combustion is discharged from the exhaust gas discharge port PA3. The exhaust gas discharge port PA3 is provided downstream of the fuel introduction inlet PA0, the first air introduction inlet PA1, and the second air introduction inlet PA2 in the combustion facility 2, in the gas flow direction AF within the combustion facility 2. The fuel introduction inlet PA0 is connected to the discharge line 2A, and the exhaust gas inside the combustion facility 2 is led out from the fuel introduction inlet PA0 to the outside of the combustion facility 2 through the discharge line 2A. In addition, the incineration ash generated by the combustion is discharged from the incineration ash discharge port PA4. The incineration ash discharge port PA4 is connected to an incineration ash discharge line 2E, and the incineration ash AS inside the combustion facility 2 is led out from the incineration ash discharge port PA4 to the outside of the combustion facility 2 through the incineration ash discharge line 2E.

In the combustion facility 2 as described above, as shown in FIG. 4, the decarbonated gas introduction line 10A may be connected to the first air introduction inlet PA1. More specifically, the decarbonated gas introduction line 10A may be connected to the air introduction line 2B and may be connected to the first air introduction inlet PA1 via the air introduction line 2B. In this case, the decarbonated gas G3 inside the decarbonated gas introduction line 10A is introduced into the air introduction line 2B, is heated by the air preheater 60 together with the air A inside the air introduction line 2B, and is introduced from the first air introduction inlet PA1 into the combustion facility 2. In addition, as shown in FIG. 5, the decarbonated gas introduction line 10A may be connected to the fuel introduction inlet PA0. More specifically, the decarbonated gas introduction line 10A may be connected to the fuel introduction line 2C and may be connected to the fuel introduction inlet PA0 via the fuel introduction line 2C. In this case, the decarbonated gas G3 inside the decarbonated gas introduction line 10A is introduced into the fuel introduction line 2C and is introduced into the combustion facility 2 from the fuel introduction inlet PA0 together with the fuel F inside the fuel introduction line 2C. In this way, by mixing the decarbonated gas G3 with the air A for combustion, the fuel F, or air for pumping the fuel F and supplying the mixture into the combustion facility 2, it is possible to ensure a longer residence time of the entrained $CO_2$ absorption liquid in the combustion facility 2, and it is possible to appropriately perform an incineration process on the $CO_2$ absorption liquid without releasing the $CO_2$ absorption liquid to the atmosphere.

The configuration of the combustion facility 2 is not limited to the above, and for example, only one of the first air introduction inlet PA1 and the second air introduction inlet PA2 may be provided, or the incineration ash discharge port PA4 may not be provided in a case where the incineration ash AS is not generated.

(Heating of Decarbonated Gas)

The decarbonated gas G3 may be heated by a heating section 70 before being introduced into the combustion facility 2. By introducing the decarbonated gas G3 in a heated state into the combustion facility 2, it is possible to adjust the temperature in the combustion facility 2 to an appropriate temperature for combustion.

Figure 6:
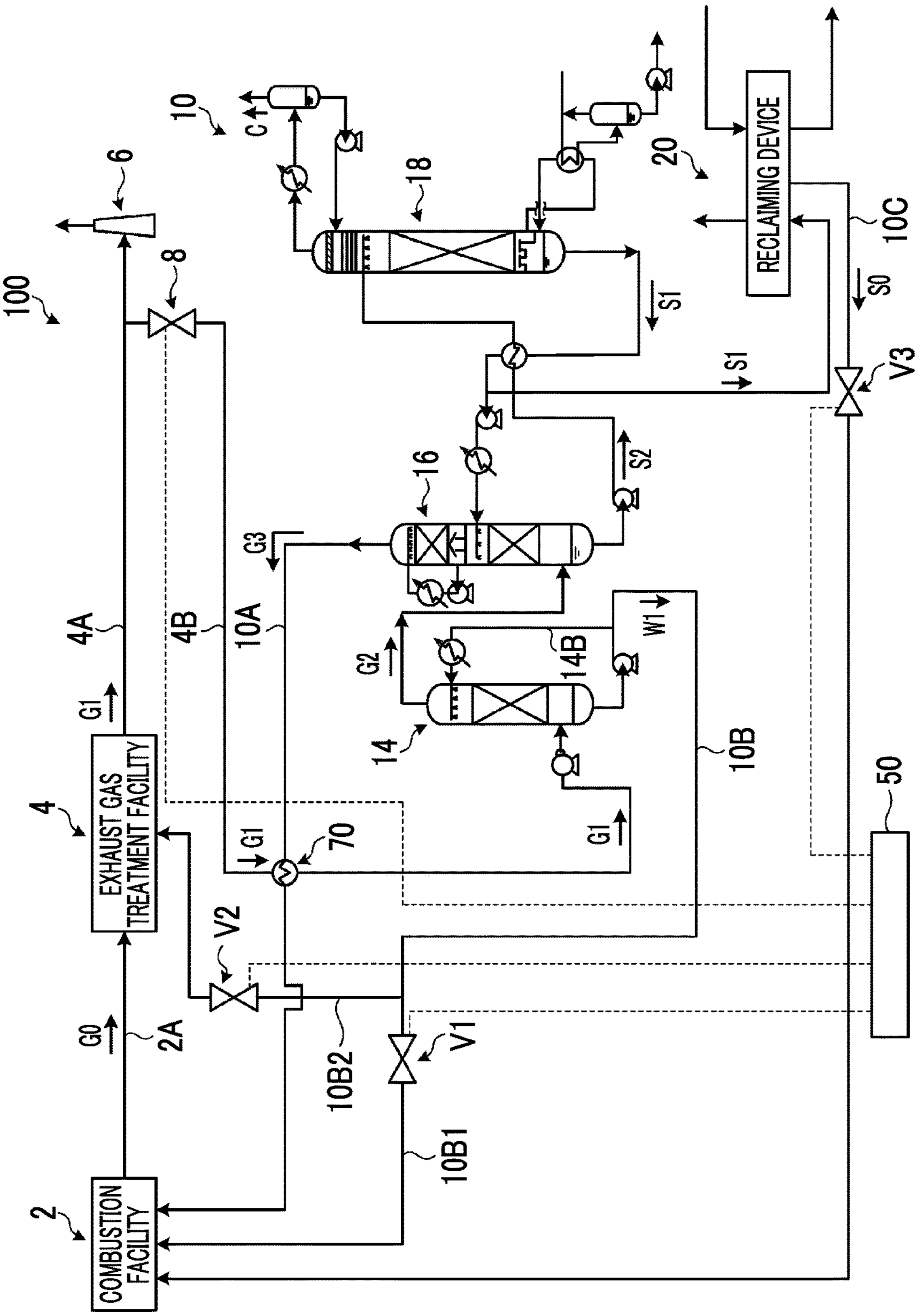
FIG. 6 is a schematic diagram illustrating an example of a heating section.
Figure 7A:
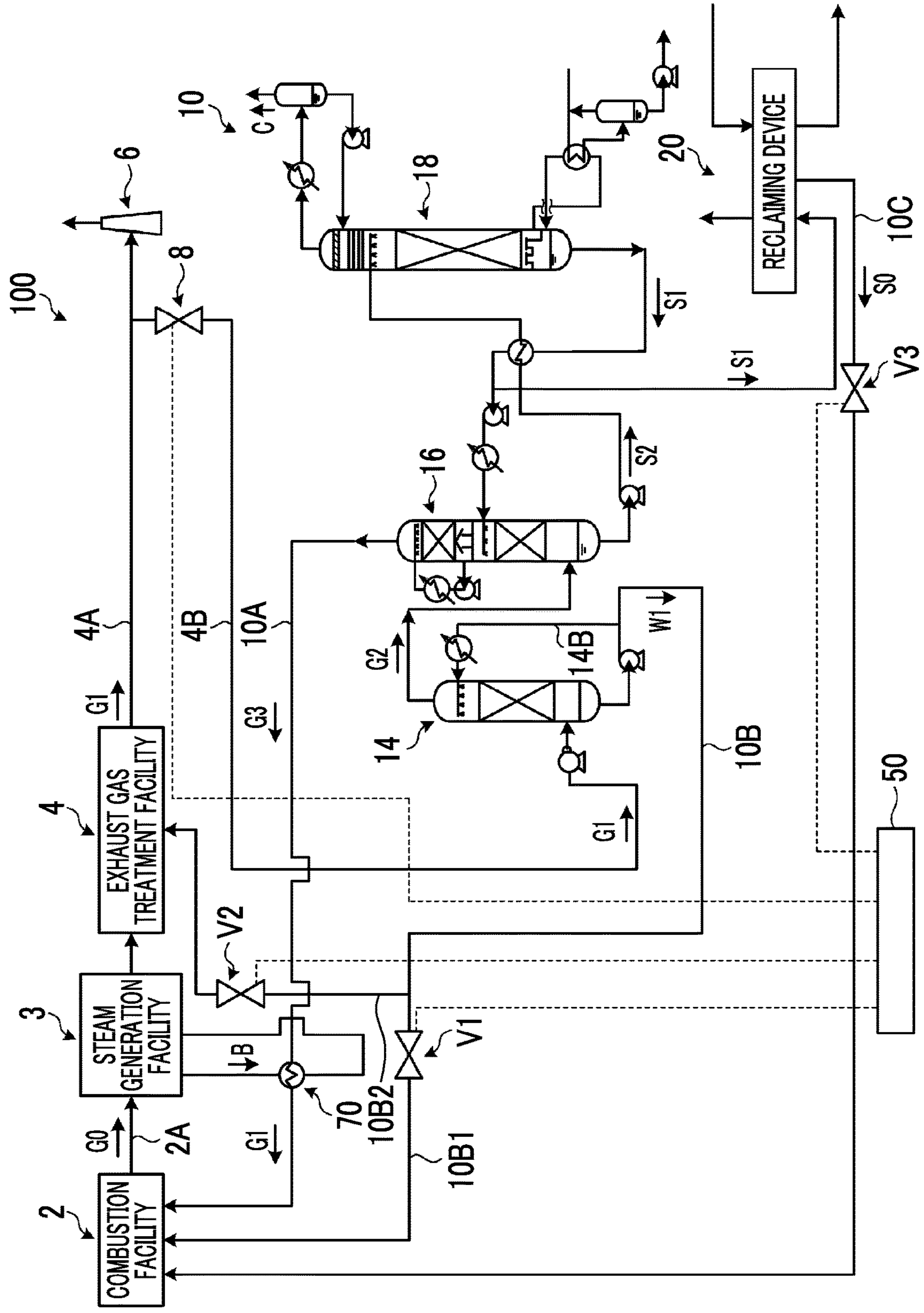
FIG. 7A is a schematic diagram illustrating an example of the heating section.

An example of a method for heating the decarbonated gas G3 will be described below. FIGS. 6 and 7A are schematic diagrams illustrating examples of the heating section. As shown in FIG. 6, the heating section 70 may exchange heat between the exhaust gas G1 before being introduced into the $CO_2$ absorption tower 16 and the decarbonated gas G3 to heat the decarbonated gas G3. Specifically, as shown in FIG. 6, the heating section 70 may be provided to transfer the heat of the exhaust gas G1 passing through the exhaust gas introduction line 4B to the decarbonated gas G3 passing through the decarbonated gas introduction line 10A. For example, the heating section 70 may have a configuration in which the exhaust gas G1 passing through the exhaust gas introduction line 4B comes into contact with an outer peripheral surface of the decarbonated gas introduction line 10A, with the decarbonated gas introduction line 10A passing through the inside of the heating section 70. Consequently, the heat of the exhaust gas G1 is transferred from the outer peripheral surface of the decarbonated gas introduction line 10A to the decarbonated gas G3 inside the decarbonated gas introduction line 10A, thereby heating the decarbonated gas G3. In addition, the heat exchange between the exhaust gas G1 and the decarbonated gas G3 is not limited to the gas-to-gas heat exchange, and the heat exchange may be performed via a heat medium. In this case, for example, the heating section 70 may cause the heat medium to flow through the outer peripheral surface of the exhaust gas introduction line 4B and the outer peripheral surface of the decarbonated gas introduction line 10A. The heat medium is heated by the exhaust gas G1 on the outer peripheral surface of the exhaust gas introduction line 4B and heats the decarbonated gas G3 on the outer peripheral surface of the decarbonated gas introduction line 10A.

Further, for example, as shown in FIG. 7A, the heating section 70 may exchange heat between the steam B generated by the heat of the exhaust gas G0 and the decarbonated gas G3 to heat the decarbonated gas G3. In this case, as shown in FIG. 7A, a steam generation facility 3 that generates steam by the heat of the exhaust gas G0 before being introduced into the $CO_2$ recovery apparatus 10 is provided. In the example of FIG. 7A, the steam generation facility 3 is provided between the combustion facility 2 and the exhaust gas treatment facility 4 in the flow direction of the exhaust gas G0. The exhaust gas G0 is introduced into the steam generation facility 3, and condensed water is heated by the heat of the exhaust gas G0 to generate the steam B. The heating section 70 is provided to transfer the heat of the steam B generated by the steam generation facility 3 to the decarbonated gas G3 passing through the decarbonated gas introduction line 10A. For example, the heating section 70 may have a configuration in which the steam B generated by the steam generation facility 3 comes into contact with the outer peripheral surface of the decarbonated gas introduction line 10A, with the decarbonated gas introduction line 10A passing through the inside of the heating section 70. Consequently, the heat of the steam B is transferred from the outer peripheral surface of the decarbonated gas introduction line 10A to the decarbonated gas G3 inside the decarbonated gas introduction line 10A, thereby heating the decarbonated gas G3.

As shown in FIGS. 6 and 7A, by heating the decarbonated gas G3 using the exhaust gas G0 or the heat of the exhaust gas G1, there is no need to separately provide the heat source that heats the decarbonated gas G3, and it is possible to appropriately adjust the temperature in the combustion facility 2 while suppressing the energy loss. However, the decarbonated gas G3 is not limited to being heated by the exhaust gas G0 or the heat of the exhaust gas G1 and may be heated by any method. For example, the heating section 70 may heat the decarbonated gas G3 by using a heat other than the heat of the exhaust gas as the heat source, or the air preheater 60 shown in FIG. 4 may be used as the heating section 70.

(Discharge of Cooling Water)

As described above, the exhaust gas cooling device 14 brings the cooling water W1 into contact with the exhaust gas G1 to cool the exhaust gas G1. Therefore, the flow rate of the cooling water W1 may increase because of the moisture in the exhaust gas G1 entrained in the cooling water W1. In the present embodiment, a portion of the cooling water W1 is discharged to at least one of the combustion facility 2 and the exhaust gas treatment facility 4, so that an excessive increase in the flow rate of the cooling water W1 inside the exhaust gas cooling device 14 is suppressed.

A configuration for discharging the cooling water W1 will be described in detail. As shown in FIG. 3, the exhaust gas cooling device 14 is connected to a cooling water introduction line 10B. In the example of the present embodiment, the cooling water introduction line 10B is connected to the cooling line 14B and is connected to the exhaust gas cooling device 14 via the cooling line 14B. However, the cooling water introduction line 10B may be directly connected to the exhaust gas cooling device 14 without passing through the cooling line 14B.

The cooling water introduction line 10B is branched into cooling water introduction lines 10B1 and 10B2, the cooling water introduction line 10B1 is connected to the combustion facility 2, and the cooling water introduction line 10B2 is connected to the exhaust gas treatment facility 4. That is, the exhaust gas cooling device 14 (cooling line 14B) and the combustion facility 2 are connected to each other via the cooling water introduction lines 10B and 10B1, and a portion of the cooling water W1 inside the exhaust gas cooling device 14 (cooling line 14B) is introduced into the combustion facility 2 via the cooling water introduction lines 10B and 10B1. The cooling water W1 introduced into the combustion facility 2 is evaporated by being heated in the combustion facility 2. The connection location of the cooling water introduction line 10B1 in the combustion facility 2 may be any position.

The cooling water introduction line 10B1 may be provided with an adjustment unit V1. The adjustment unit V1 is an openable/closable valve in the present embodiment, and introduces the cooling water W1 into the combustion facility 2 in an opened state and stops the introduction of the cooling water W1 into the combustion facility 2 in a closed state. In addition, the adjustment unit V1 can adjust the flow rate of the cooling water W1 to be introduced into the combustion facility 2 by adjusting the opening degree thereof. The adjustment unit V1 may be controlled by the control device 50. The control device 50 controls the adjustment unit V1 to control the flow rate of the cooling water W1 to be introduced into the combustion facility 2 through the adjustment unit V1. The control device 50 may adjust the flow rate of the cooling water W1, for example, according to the combustion state in the combustion facility 2. In this case, for example, the control device 50 may increase the flow rate of the cooling water W1 to be introduced into the combustion facility 2 as the combustion amount in the combustion facility 2 increases (for example, as the introduction amount of the fuel F increases).

The exhaust gas cooling device 14 (cooling line 14B) and the exhaust gas treatment facility 4 are connected to each other via the cooling water introduction lines 10B and 10B2, and a portion of the cooling water W1 inside the exhaust gas cooling device 14 (cooling line 14B) is introduced into the exhaust gas treatment facility 4 via the cooling water introduction lines 10B and 10B2. The cooling water W1 introduced into the exhaust gas treatment facility 4 is treated in the exhaust gas treatment facility 4. For example, the cooling water introduction line 10B2 may be connected to the temperature-reducing tower of the exhaust gas treatment facility 4. In this case, the cooling water W1 introduced from the cooling water introduction line 10B2 into the temperature-reducing tower is sprayed toward the exhaust gas G0 in the temperature-reducing tower, thereby reducing the temperature of the exhaust gas G0.

The cooling water introduction line 10B2 may be provided with an adjustment unit V2. The adjustment unit V2 is an openable/closable valve in the present embodiment, and introduces the cooling water W1 into the exhaust gas treatment facility 4 in an opened state and stops the introduction of the cooling water W1 into the exhaust gas treatment facility 4 in a closed state. In addition, the adjustment unit V2 can adjust the flow rate of the cooling water W1 to be introduced into the exhaust gas treatment facility 4 by adjusting the opening degree thereof. The adjustment unit V2 may be controlled by the control device 50. The control device 50 controls the adjustment unit V2 to control the flow rate of the cooling water W1 to be introduced into the exhaust gas treatment facility 4 through the adjustment unit V2. The control device 50 may adjust the flow rate of the cooling water W1, for example, according to the flow rate of the exhaust gas G0 to be introduced into the exhaust gas treatment facility 4. In this case, for example, the control device 50 may increase the flow rate of the cooling water W1 to be introduced into the exhaust gas treatment facility 4 as the exhaust gas G0 to be introduced into the exhaust gas treatment facility 4 increases.

The control device 50 may control the adjustment units V1 and V2 to introduce the cooling water W1 corresponding to an increased flow rate inside the exhaust gas cooling device 14 into the combustion facility 2 or the exhaust gas treatment facility 4. Consequently, a constant flow rate of the cooling water W1 inside the exhaust gas cooling device 14 can be maintained. There is a concern that the cooling water W1 may reduce the combustion temperature in the combustion facility 2. Therefore, the control device 50 may adjust, for example, the flow rate of the cooling water W1 to be supplied to the combustion facility 2 such that the flow rate corresponding to the combustion state in the combustion facility 2 is supplied, and may introduce the total amount of the cooling water W1 that is not supplied to the combustion facility 2 (a flow rate obtained by subtracting the cooling water W1 to be supplied to the combustion facility 2 from the cooling water W1 increased inside the exhaust gas cooling device 14) in the cooling water W1 increased inside the exhaust gas cooling device 14, into the exhaust gas treatment facility 4. In this case, the adjustment unit V2 may not be provided.

Figure 7B:
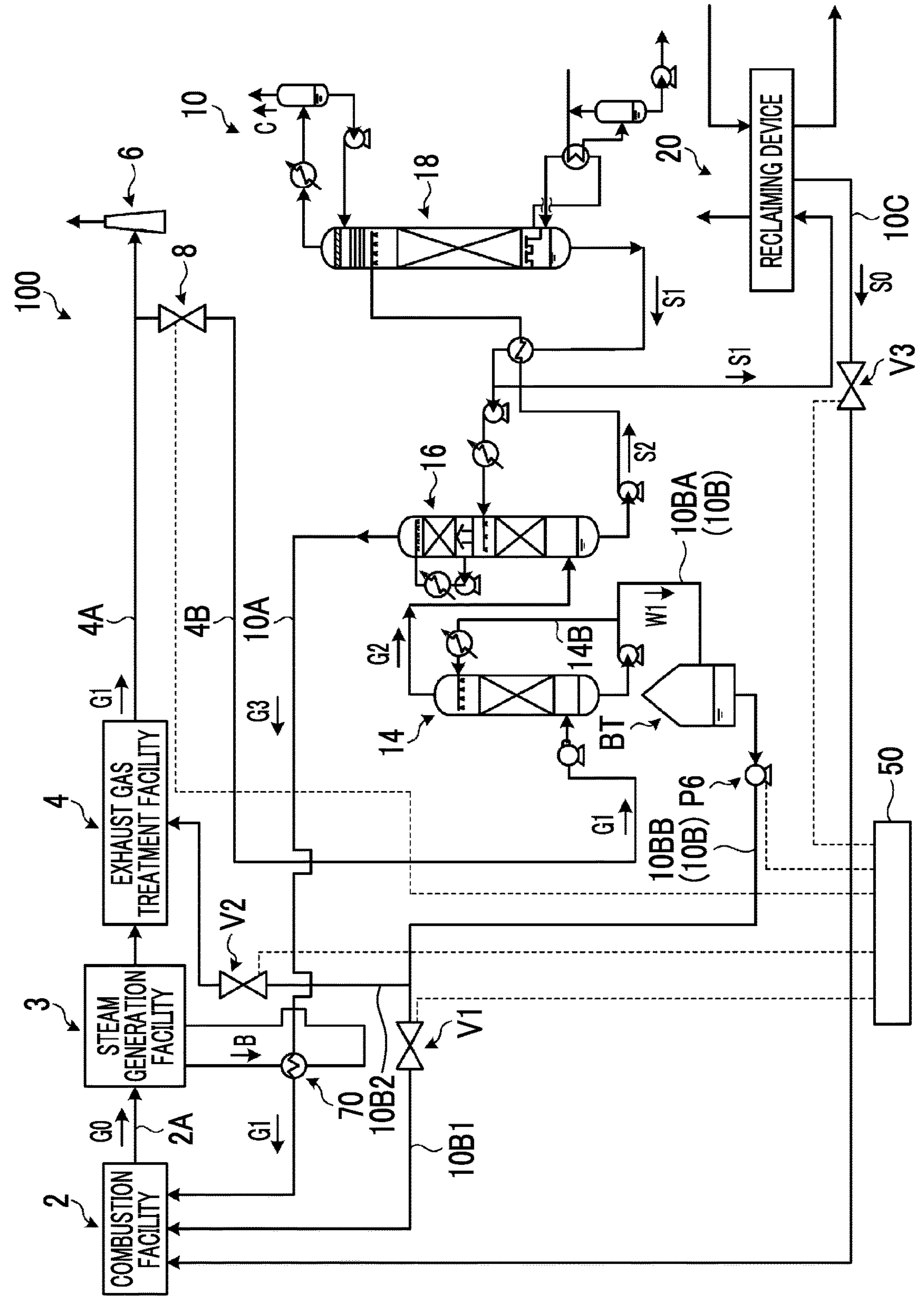
FIG. 7B is a schematic diagram illustrating an example of the heating section.

FIG. 7B is a schematic diagram illustrating an example of the heating section. As shown in FIG. 7B, the cooling water introduction line 10B may be provided with a buffer tank BT that temporarily stores the cooling water W1 corresponding to the increased flow rate inside the exhaust gas cooling device 14. By providing the buffer tank BT, it is possible to more suitably suppress an increase in the cooling water W1 inside the exhaust gas cooling device 14. In this case, example, the cooling water W1 is introduced into the buffer tank BT from a cooling water introduction line 10BA, which is a portion upstream of the buffer tank BT on the cooling water introduction line 10B, and the cooling water W1 is then stored in the buffer tank BT. In addition, in the example of FIG. 7B, a cooling water introduction line 10BB, which is a portion downstream of the buffer tank BT on the cooling water introduction line 10B, is connected to a bottom portion of the buffer tank BT. The cooling water introduction line 10BB is provided with a pump P6 which is a mechanism that adjusts the flow rate in the buffer tank BT. The control device 50 controls the pump P6 to lead out the cooling water W1 stored in the buffer tank BT to the cooling water introduction lines 10B1 and 10B2 via the cooling water introduction line 10BB. Consequently, the flow rate in the buffer tank BT is adjusted. The connection location of the cooling water introduction line 10BB is not limited to a bottom surface of the buffer tank BT and may be any location. In addition, the pump P6 is not an essential configuration, and any device other than the pump may be provided to adjust the flow rate in the buffer tank BT.

(Heating of Cooling Water)

In addition, the cooling water W1 may be heated before being supplied to the combustion facility 2 or the exhaust gas treatment facility 4. The cooling water W1 may be heated by the same method as the method in which the decarbonated gas G3 is heated by the heating section 70. That is, for example, the heating section may exchange heat between the exhaust gas G1 before being introduced into the $CO_2$ absorption tower 16 and the cooling water W1 to heat the cooling water W1, or may exchange heat between the steam B generated by the heat of the exhaust gas G0 and the cooling water W1 to heat the cooling water W1.

Figure 8:
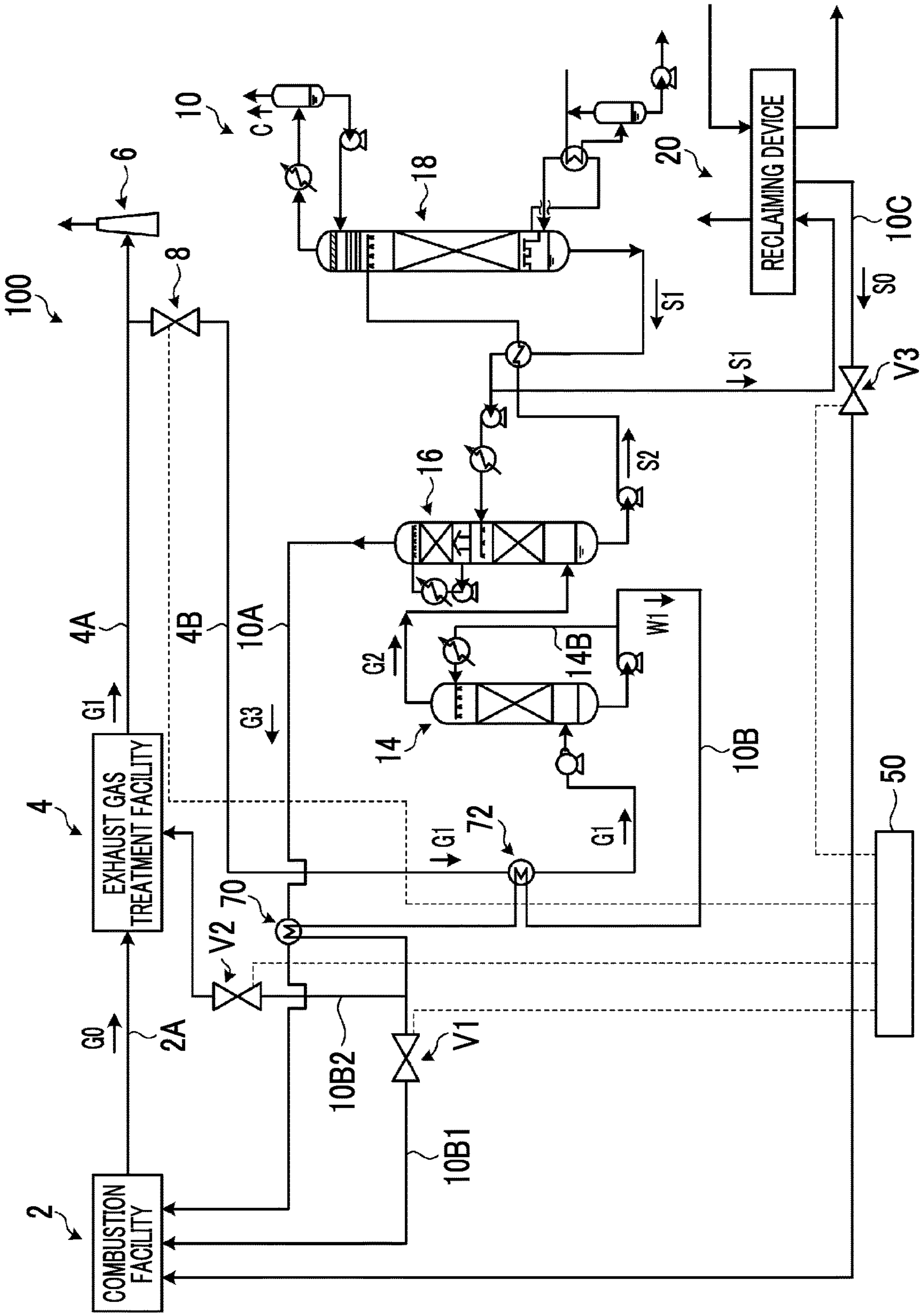
FIG. 8 is a schematic diagram showing an example of a heat exchange method of cooling water.

The cooling water W1 may be subjected to heat exchange with the decarbonated gas G3 after the heat exchange with the exhaust gas G0 or the exhaust gas G1. FIG. 8 is a schematic diagram showing an example of a heat exchange method for cooling water. In the example of FIG. 8, the $CO_2$ recovery system 100 is provided with heating sections 70 and 72. The heating section 72 is provided to transfer the heat of the exhaust gas G1 passing through the exhaust gas introduction line 4B to the cooling water W1 passing through the cooling water introduction line 10B. For example, the heating section 72 may have a configuration in which the exhaust gas G1 passing through the exhaust gas introduction line 4B comes into contact with the outer peripheral surface of the cooling water introduction line 10B, with the cooling water introduction line 10B passing through the inside of the heating section 72. Consequently, the heat of the exhaust gas G1 is transferred from the outer peripheral surface of the cooling water introduction line 10B to the cooling water W1 inside the cooling water introduction line 10B, thereby heating the cooling water W1. In addition, the heating section 70 is provided to transfer the heat of the cooling water W1 passing through the cooling water introduction line 10B to the decarbonated gas G3 passing through the decarbonated gas introduction line 10A. For example, the heating section 70 may have a configuration in which the cooling water W1 passing through the cooling water introduction line 10B comes into contact with the outer peripheral surface of the decarbonated gas introduction line 10A, with the decarbonated gas introduction line 10A passing through the inside of the heating section 70. As a result, the heat of the cooling water W1 is transferred from the outer peripheral surface of the decarbonated gas introduction line 10A to the decarbonated gas G3 inside the decarbonated gas introduction line 10A, thereby heating the decarbonated gas G3.

In addition, in the above description, the cooling water W1 inside the exhaust gas cooling device 14 is supplied to both the combustion facility 2 and the exhaust gas treatment facility 4, but the present disclosure is not limited thereto, and the cooling water W1 may be supplied to any one of the combustion facility 2 and the exhaust gas treatment facility 4. For example, in a case where the cooling water W1 inside the exhaust gas cooling device 14 is supplied only to the combustion facility 2, the cooling water introduction line 10B provided with the adjustment unit V1 may be configured to connect the exhaust gas cooling device 14 (cooling line 14B) and the combustion facility 2 to each other without providing the cooling water introduction line 10B2 and the adjustment unit V2. In addition, for example, in a case where the cooling water W1 inside the exhaust gas cooling device 14 is supplied only to the exhaust gas treatment facility 4, the cooling water introduction line 10B provided with the adjustment unit V2 may be configured to connect the exhaust gas cooling device 14 (cooling line 14B) and the exhaust gas treatment facility 4 to each other without providing the cooling water introduction line 10B1 and the adjustment unit V1.

In addition, in the present embodiment, both the supply of the decarbonated gas G3 inside the $CO_2$ absorption tower 16 to the combustion facility 2 and the supply of the cooling water W1 inside the exhaust gas cooling device 14 to the combustion facility 2 or the exhaust gas treatment facility 4 are performed. However, both of these are not essential, and only one of the supply of the decarbonated gas G3 to the combustion facility 2 and the supply of the cooling water W1 to the combustion facility 2 or the exhaust gas treatment facility 4 may be performed. Supplying the decarbonated gas G3 to the combustion facility 2 suppresses the discharge of the $CO_2$ absorption liquid S1 to the outside so that the process of recovering $CO_2$ from the exhaust gas can be appropriately executed, and supplying the cooling water W1 to the combustion facility 2 or the exhaust gas treatment facility 4 can suppress an excessive increase in the cooling water W1 inside the exhaust gas cooling device 14 so that the process of recovering $CO_2$ from the exhaust gas can be appropriately executed.

(Discharge of Impurity)

As described above, the reclaiming device 20 extracts the impurity S0 from the $CO_2$ absorption liquid S1. In the present embodiment, the impurity S0 extracted by the reclaiming device 20 may be combusted in the combustion facility 2 by discharging the impurity S0 to the combustion facility 2. Since the impurity S0 contains the component of the $CO_2$ absorption liquid S1, combusting the impurity S0 in the combustion facility 2 can more suitably suppress the discharge of the $CO_2$ absorption liquid S1 to the outside.

As shown in FIG. 3, the reclaiming device 20 and the combustion facility 2 are connected to each other by an impurity introduction line 10C. The impurity S0 extracted by the reclaiming device 20 is introduced into the combustion facility 2 through the impurity introduction line 10C. The impurity S0 introduced into the combustion facility 2 is combusted in the combustion facility 2. The connection location of the impurity introduction line 10C in the combustion facility 2 may be at any position.

The impurity introduction line 10C may be provided with an adjustment unit V3. The adjustment unit V3 is an openable/closable valve in the present embodiment, and introduces the impurity S0 into the combustion facility 2 in an opened state and stops the introduction of the impurity S0 into the combustion facility 2 in a closed state. In addition, the adjustment unit V3 can adjust the flow rate of the impurity so to be introduced into the combustion facility 2 by adjusting the opening degree thereof. The adjustment unit V3 may be controlled by the control device 50. The control device 50 controls the adjustment unit V3 to control the flow rate of the impurity S0 to be introduced into the combustion facility 2 through the adjustment unit V3. The control device 50 may adjust the flow rate of the impurity S0 according to, for example, the combustion state in the combustion facility 2. In this case, for example, the control device 50 may increase the flow rate of the impurity so to be introduced into the combustion facility 2 as the combustion amount in the combustion facility 2 increases (for example, as the introduction amount of the fuel F increases).

Second Embodiment

Next, a second embodiment will be described. The second embodiment is different from the first embodiment in that the decarbonated gas G3 is introduced into a position where exhaust gas recirculation (EGR) can be performed in the combustion facility 2. In the second embodiment, description of the parts with a configuration common to the first embodiment will not be repeated. The EGR indicates the circulation of the exhaust gas into an incinerator to promote the mixing of the air in the combustion facility 2.

Figure 9:
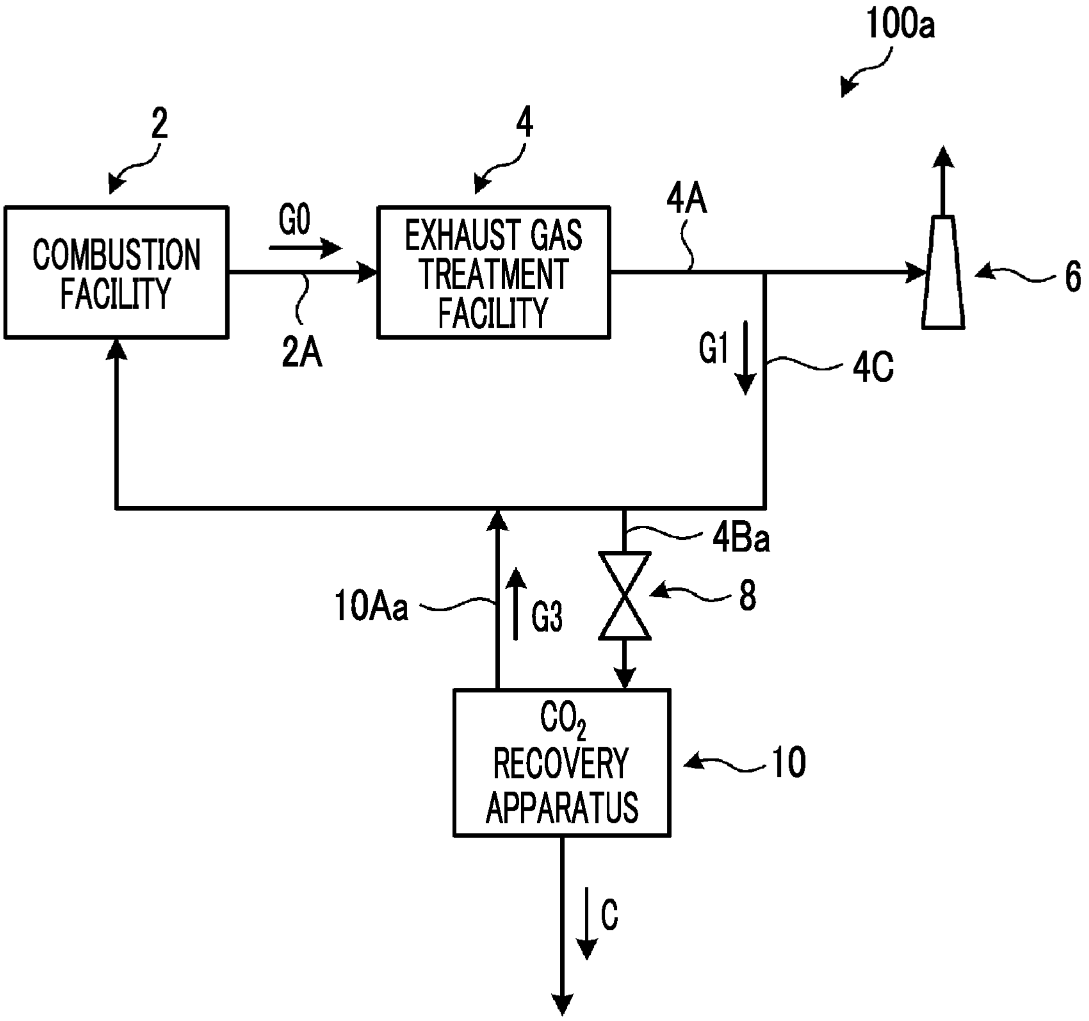
FIG. 9 is a schematic block diagram of a $CO_2$ recovery system according to a second embodiment.

FIG. 9 is a schematic block diagram of a $CO_2$ recovery system according to the second embodiment. As shown in FIG. 9, in a $CO_2$ recovery system 100*a* according to the second embodiment, a side on which the exhaust gas G1 of the exhaust gas treatment facility 4 is discharged and the combustion facility 2 are connected to each other by an EGR line 4C. In the present embodiment, the EGR line 4C is connected to the discharge line 4A and the combustion facility 2. The exhaust gas G1 treated by the exhaust gas treatment facility 4 is introduced into the combustion facility 2 through the discharge line 4A and the EGR line 4C. The EGR line 4C connects the discharge line 4A (the exhaust gas treatment facility 4) and the combustion facility 2 without passing through the $CO_2$ recovery apparatus 10. In other words, in a flow channel passing through the EGR line 4C from the exhaust gas treatment facility 4 to the combustion facility 2, the $CO_2$ recovery apparatus 10 is not connected in series, and the $CO_2$ recovery apparatus 10 is branched from the EGR line 4C and connected, or is connected in parallel to the EGR line 4C, as will be described below.

An exhaust gas introduction line 4Ba for introducing the exhaust gas G1 from the exhaust gas treatment facility 4 into the $CO_2$ recovery apparatus 10 (exhaust gas cooling device 14) is connected to the EGR line 4C and the $CO_2$ recovery apparatus 10 (exhaust gas cooling device 14). That is, the exhaust gas introduction line 4Ba is branched from the EGR line 4C and connected. The exhaust gas G1 inside the EGR line 4C is introduced into the $CO_2$ recovery apparatus 10 (exhaust gas cooling device 14) through the exhaust gas introduction line 4Ba. The control device 50 (see FIG. 3) adjusts the flow rate of the exhaust gas G1 to be introduced from the EGR line 4C to the $CO_2$ recovery apparatus 10 through the adjustment unit 8 provided on the exhaust gas introduction line 4Ba. A decarbonated gas introduction line 10Aa for introducing the decarbonated gas G3 from the $CO_2$ recovery apparatus 10 ($CO_2$ absorption tower 16) into the combustion facility 2 is connected to the $CO_2$ recovery apparatus 10 ($CO_2$ absorption tower 16) and the EGR line 4C. The decarbonated gas G3 inside the $CO_2$ recovery apparatus 10 ($CO_2$ absorption tower 16) is introduced into the combustion facility 2 through the decarbonated gas introduction line 10Aa and the EGR line 4C.

Figure 10:
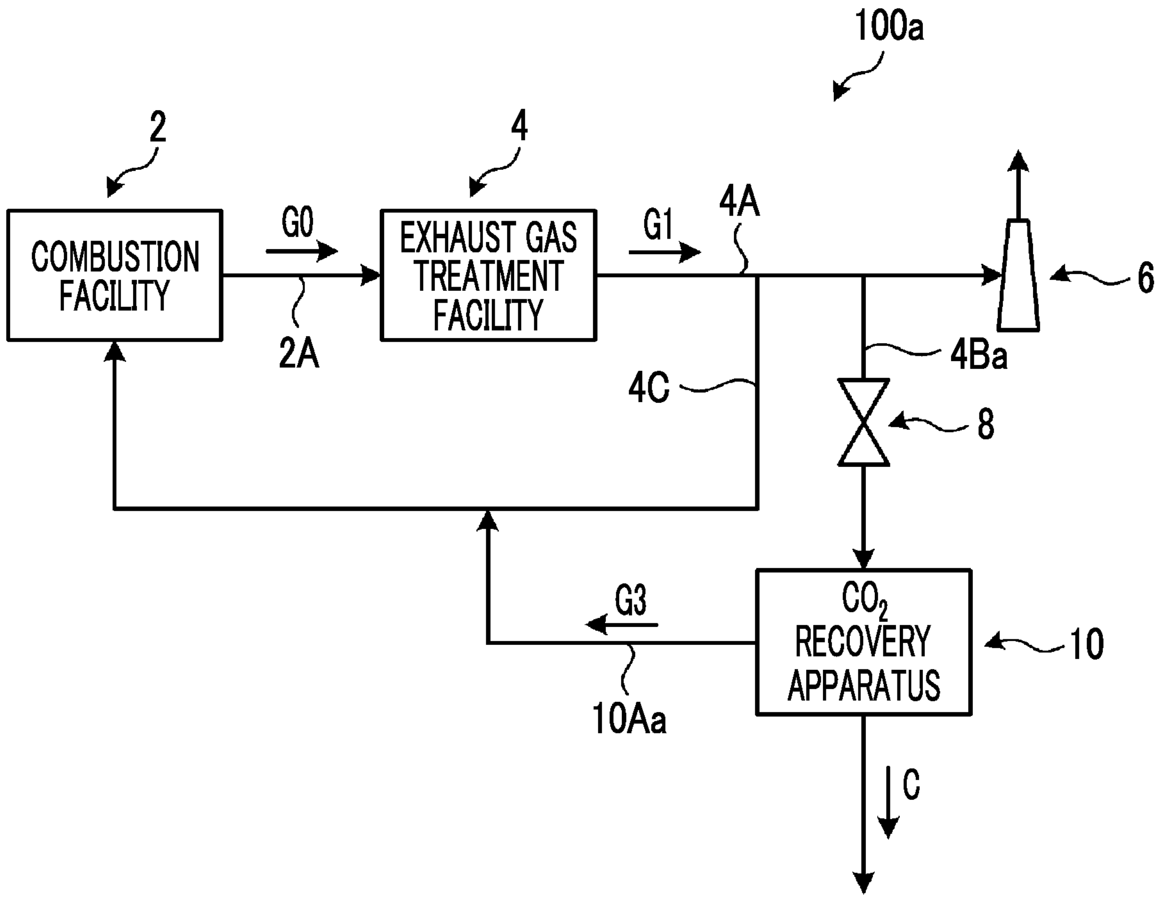
FIG. 10 is a schematic block diagram of a $CO_2$ recovery system according to another example of the second embodiment.

The configuration of the $CO_2$ recovery system 100*a* is not limited to that shown in FIG. 9. FIG. 10 is a schematic block diagram of a $CO_2$ recovery system according to another example of the second embodiment. For example, as shown in FIG. 10, the exhaust gas introduction line 4Ba may be directly connected to the discharge line 4A. That is, the exhaust gas introduction line 4Ba may be connected in parallel to the flow channel passing through the EGR line 4C from the exhaust gas treatment facility 4 to the combustion facility 2. In this case, it is preferable that the exhaust gas introduction line 4Ba is connected to the discharge line 4A downstream of the EGR line 4C in the flow of the exhaust gas G1.

Figure 11:
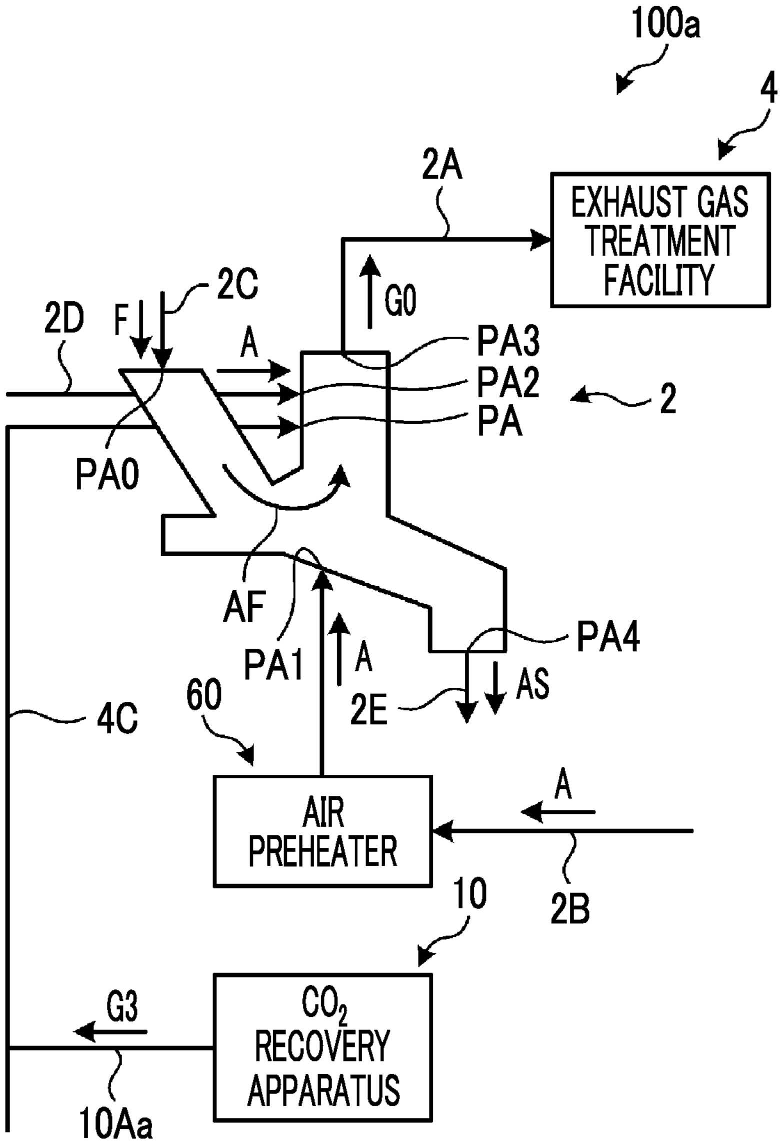
FIG. 11 is a schematic diagram illustrating an example of the connection position of the decarbonated gas introduction line in the combustion facility.

FIG. 11 is a schematic diagram illustrating an example of the connection position of the decarbonated gas introduction line in the combustion facility. As shown in FIG. 11, an introduction inlet into which the decarbonated gas G3 is introduced in the combustion facility 2 is a decarbonated gas introduction inlet PA. The decarbonated gas introduction inlet PA is connected to the EGR line 4C. The decarbonated gas G3 is introduced into the combustion facility 2 through the decarbonated gas introduction line 10Aa, the EGR line 4C, and the decarbonated gas introduction inlet PA. It can also be said that the decarbonated gas introduction inlet PA is connected to the decarbonated gas introduction line 10Aa because the EGR line 4C is connected to the decarbonated gas introduction line 10Aa.

The decarbonated gas introduction inlet PA is provided in the combustion facility 2 at a position where EGR is appropriately performed, in other words, at a position where a combustion gas inside the combustion facility 2 can be appropriately stirred. Specifically, it is preferable that the decarbonated gas introduction inlet PA is provided upstream of an air introduction inlet into which the air A is introduced, in the gas flow direction AF within the combustion facility 2. Furthermore, it is preferable that the decarbonated gas introduction inlet PA is formed upstream of the second air introduction inlet PA2 into which the air A (secondary air) is introduced, in the gas flow direction AF within the combustion facility 2. For example, the decarbonated gas introduction inlet PA may be provided at the same position as the first air introduction inlet PA1 into which the air A (primary air) is introduced, or may be provided between the first air introduction inlet PA1 and the second air introduction inlet PA2 in the gas flow direction AF within the combustion facility 2. By providing the decarbonated gas introduction inlet PA upstream of the air introduction inlet, it is possible to appropriately stir the combustion gas inside the combustion facility 2 and to achieve the decarbonated gas G3 appropriately functioning as a gas for EGR.

Third Embodiment

Next, a third embodiment will be described. The third embodiment is different from the first embodiment in that oxygen is introduced into the combustion facility 2 together with the decarbonated gas G3. In the third embodiment, description of the parts with a configuration common to the first embodiment will not be repeated. The third embodiment can also be applied to the second embodiment.

Figure 12:
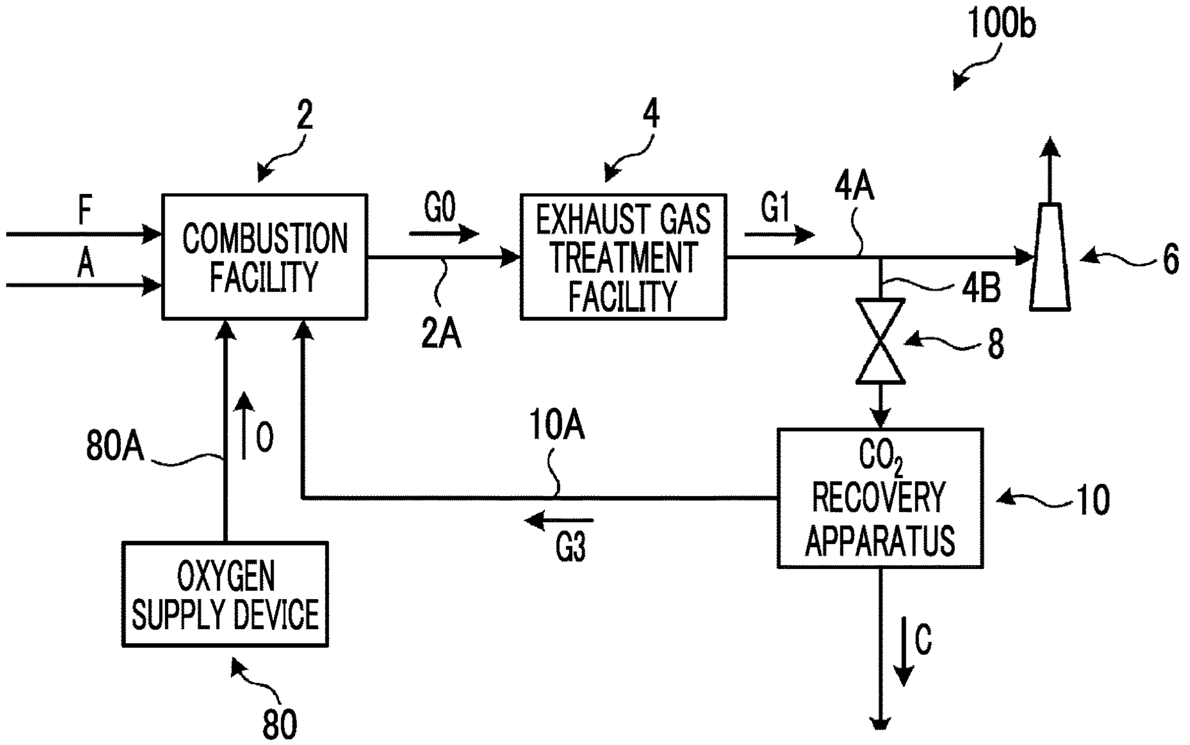
FIG. 12 is a schematic block diagram of a $CO_2$ recovery system according to a third embodiment.

FIG. 12 is a schematic block diagram of a $CO_2$ recovery system according to the third embodiment. As shown in FIG. 12, a $CO_2$ recovery system 100*b* according to the third embodiment includes an oxygen supply device 80 and an oxygen introduction line 80A. The oxygen supply device 80 is a device that supplies oxygen to the oxygen introduction line 80A. The oxygen supply device 80 has a configuration in which, for example, a tank that stores oxygen and an adjustment unit (a valve or the like) that leads out oxygen from the tank to the oxygen introduction line 80A are provided, but the oxygen supply device 80 is not limited to the configuration, and any mechanism capable of supplying oxygen may be used. The oxygen introduction line 80A is connected to the oxygen supply device 80 and the combustion facility 2. Oxygen O from the oxygen supply device 80 is introduced into the combustion facility 2 through the oxygen introduction line 80A and is used for combustion together with the air A inside the combustion facility 2. The connection position of the oxygen introduction line 80A in the combustion facility 2 may be any position.

In the combustion facility 2, the amount of oxygen in the combustion facility 2 decreases because the decarbonated gas G3 having a small amount of oxygen is introduced, but in the present embodiment, the oxygen O is introduced into the combustion facility 2 to increase the amount of oxygen in the combustion facility 2, so that combustion in the combustion facility 2 can be appropriately performed. As a result, the $CO_2$ concentration in the exhaust gas G0 increases, and the $CO_2$ recovery can be more suitably performed.

In the example of FIG. 12, the oxygen introduction line is not connected to the decarbonated gas introduction line 10A, and the decarbonated gas G3 and the oxygen O are introduced into the combustion facility 2 in a state of not being mixed with each other. However, the present disclosure is not limited thereto, and the oxygen introduction line 80A may be connected to the decarbonated gas introduction line 10A. In this case, the oxygen from the oxygen introduction line 80A is introduced into the decarbonated gas introduction line 10A, and the oxygen O and the decarbonated gas G3 are introduced into the combustion facility 2 in a state of being mixed in the decarbonated gas introduction line 10A. As a result, it is possible to achieve a more uniform distribution of oxygen concentration in the combustion facility 2 and to more appropriately perform the combustion.

(Effects)

The $CO_2$ recovery system 100 according to the present disclosure includes the combustion facility 2, the $CO_2$ absorption tower 16 that brings the exhaust gas G0 containing $CO_2$, which is discharged from the combustion facility 2 and introduced into the $CO_2$ absorption tower 16, into contact with the $CO_2$ absorption liquid S1 to remove the $CO_2$ from the exhaust gas G0, and the decarbonated gas introduction line 10A that is connected to the $CO_2$ absorption tower 16 and the combustion facility 2 and allows the decarbonated gas G3, which is the exhaust gas G0 from which the $CO_2$ has been removed in the $CO_2$ absorption tower 16, to be introduced into the combustion facility 2. Here, it is desirable that the component of the $CO_2$ absorption liquid S1 is not discharged to the outside (the outside of the $CO_2$ recovery system 100). Since the component of the $CO_2$ absorption liquid S1 is entrained in the decarbonated gas G3, the component of the $CO_2$ absorption liquid S1 is discharged to the outside if the decarbonated gas G3 is discharged to the outside. In that respect, in the present disclosure, since the decarbonated gas G3 is introduced into the combustion facility 2, the $CO_2$ absorption liquid S1 entrained in the decarbonated gas G3 is incinerated, so that the discharge of the component of the $CO_2$ absorption liquid S1 to the outside can be suppressed. As a result, it is possible to appropriately execute the process of recovering $CO_2$ from the exhaust gas.

It is preferable that the $CO_2$ recovery system 100 further includes the adjustment unit 8 that adjusts the flow rate of the exhaust gas G1 to be introduced into the $CO_2$ absorption tower 16. By adjusting the flow rate of the exhaust gas G1 to be introduced into the $CO_2$ absorption tower 16, it is possible to adjust the flow rate of the decarbonated gas G3 to be introduced from the $CO_2$ absorption tower 16 into the combustion facility 2, so that the combustion in the combustion facility 2 can be appropriately performed.

It is preferable that the adjustment unit 8 adjusts the flow rate of the exhaust gas G1 to be introduced into the $CO_2$ absorption tower 16 according to the combustion state in the combustion facility 2. By adjusting the flow rate according to the combustion state in the combustion facility 2, it is possible to appropriately perform the combustion in the combustion facility 2.

It is preferable that the $CO_2$ recovery system 100 further includes the heating section 70 that heats the decarbonated gas G3 before being introduced into the combustion facility 2. By introducing the decarbonated gas G3 in a heated state into the combustion facility 2, it is possible to adjust the temperature in the combustion facility 2 to an appropriate temperature for combustion.

It is preferable that the heating section 70 exchanges heat between the exhaust gas G1 before being introduced into the $CO_2$ absorption tower 16 and the decarbonated gas G3 to heat the decarbonated gas G3, and it is more preferable that the heating section 70 exchanges heat between the exhaust gas G1 before being introduced into the exhaust gas cooling device 14 and the decarbonated gas G3 to heat the decarbonated gas G3. That is, it can be said that the heating section 70 may exchange heat between the cooling water W1 and the exhaust gas located at any position upstream of the $CO_2$ absorption tower 16 in the flow of the exhaust gas, or may exchange heat between the cooling water W1 and the exhaust gas located at any position upstream of the exhaust gas cooling device 14 in the flow of the exhaust gas. By heating the decarbonated gas G3 using the heat of the exhaust gas G1, there is no need to separately provide the heat source that heats the decarbonated gas G3, and it is possible to appropriately adjust the temperature in the combustion facility 2 while suppressing the energy loss.

It is preferable that the $CO_2$ recovery system 100 further includes the steam generation facility 3 that generates the steam B by the heat of the exhaust gas G0 discharged from the combustion facility 2, in which the heating section 70 exchanges heat between the decarbonated gas G3 and the steam B to heat the decarbonated gas G3. By heating the decarbonated gas G3 using the heat of the exhaust gas G0, there is no need to separately provide the heat source that heats the decarbonated gas G3, and it is possible to appropriately adjust the temperature in the combustion facility 2 while suppressing the energy loss.

The $CO_2$ recovery system 100 further includes the exhaust gas cooling device 14 that s provided at an upstream stage of the $CO_2$ absorption tower 16 in the flow of the exhaust gas G1 and brings the exhaust gas G1 into contact with cooling water W1 to cool the exhaust gas G1, and the cooling water introduction line 10B that is connected to the exhaust gas cooling device 14 and the combustion facility 2 and allows the cooling water W1 to be introduced into the combustion facility 2. By discharging the cooling water W1 to the combustion facility 2, it is possible to suppress an excessive increase inside the flow rate of the cooling water W1 in the exhaust gas cooling device 14.

It is preferable that the $CO_2$ recovery system 100 further includes the exhaust gas treatment facility 4 that is provided at a downstream stage of the combustion facility 2 in the flow of the exhaust gas G0 and treats the exhaust gas G0. It is preferable that the cooling water introduction line 10B is branched into a line that is connected to the exhaust gas cooling device 14 and the combustion facility 2 and that allows the cooling water W1 to be introduced into the combustion facility 2, and a line that is connected to the exhaust gas cooling device 14 and the exhaust gas treatment facility 4 and that allows the cooling water W1 to be introduced into the exhaust gas treatment facility 4. By discharging the cooling water W1 to the combustion facility 2 and the exhaust gas treatment facility 4, it is possible to suppress an excessive increase in the flow rate of the cooling water W1 inside the exhaust gas cooling device 14.

It is preferable that the $CO_2$ recovery system 100 further includes the adjustment unit that adjusts the flow rate of the cooling water W1 to be introduced into the combustion facility 2 according to the combustion state in the combustion facility 2. By adjusting the flow rate according to the combustion state in the combustion facility 2, it is possible to appropriately perform the combustion in the combustion facility 2 while suppressing an excessive increase in the flow rate of the cooling water W1 inside the exhaust gas cooling device 14.

It is preferable that the $CO_2$ recovery system 100 further includes the temperature-reducing tower that is provided at a downstream stage of the combustion facility 2 in the flow of the exhaust gas G0 and cools the exhaust gas G0, the exhaust gas cooling device 14 that is provided between the temperature-reducing tower and the $CO_2$ absorption tower 16 in the flow of the exhaust gas G1 and brings the exhaust gas G1 after being cooled by the temperature-reducing tower into contact with the cooling water W1 to cool the exhaust gas, and the cooling water introduction line 10B that is connected to the exhaust gas cooling device 14 and the temperature-reducing tower and allows the cooling water W1 to be introduced into the temperature-reducing tower. By discharging the cooling water W1 to the temperature-reducing tower, it is possible to suppress an excessive increase in the flow rate of the cooling water W1 inside the exhaust gas cooling device 14.

It is preferable that the $CO_2$ recovery system 100 further includes the adjustment unit that adjusts the flow rate of the cooling water W1 to be introduced into the temperature-reducing tower according to the flow rate of the exhaust gas G0 to be introduced into the temperature-reducing tower. By adjusting the flow rate of the cooling water W1 according to the flow rate of the exhaust gas G0 to be introduced into the temperature-reducing tower, it is possible to appropriately cool the exhaust gas G0 in the temperature-reducing tower while suppressing an excessive increase in the flow rate of the cooling water W1 inside the exhaust gas cooling device 14.

It is preferable that the buffer tank BT that stores the cooling water W1 corresponding to an increased flow rate in the exhaust gas cooling device 14 is provided on the cooling water introduction line 10B. By providing the buffer tank BT, it is possible to appropriately suppress an excessive increase in the flow rate of the cooling water W1 inside the exhaust gas cooling device 14.

It is preferable that the $CO_2$ recovery system 100 further includes the heating section that heats the cooling water W1 led out from the exhaust gas cooling device 14. By heating the cooling water W1, for example, it is possible to suppress a decrease in the combustion temperature of the combustion facility 2 and to increase the treatment amount of the cooling water.

It is preferable that the heating section 70 exchanges heat between the exhaust gas G1 before being introduced into the $CO_2$ absorption tower 16 and the cooling water W1 to heat the cooling water W1, and it is more preferable that the heating section 70 exchanges heat between the exhaust gas G1 before being introduced into the exhaust gas cooling device 14 and the cooling water W1 to heat the cooling water W1. That is, it can be said that the heating section 70 may exchange heat between the cooling water W1 and the exhaust gas located at any position upstream of the $CO_2$ absorption tower 16 in the flow of the exhaust gas, or may exchange heat between the cooling water W1 and the exhaust gas located at any position upstream of the exhaust gas cooling device 14 in the flow of the exhaust gas. By heating the cooling water W1, for example, it is possible to suppress a decrease in the combustion temperature of the combustion facility 2 and to increase the treatment amount of the cooling water.

It is preferable that the $CO_2$ recovery system 100 further includes the steam generation facility 3 that generates the steam B by the heat of the exhaust gas G0 discharged from the combustion facility 2, in which the heating section 70 exchanges heat between the cooling water W1 and the steam B to heat the cooling water W1. By heating the cooling water W1, for example, it is possible to suppress a decrease in the combustion temperature of the combustion facility 2 and to increase the treatment amount of the cooling water.

It is preferable that the heating section 72 transfers the heat of the exhaust gas G1 passing through the exhaust gas introduction line 4B, which connects the combustion facility 2 and the exhaust gas cooling device 14 to each other, to the cooling water W1 to heat the cooling water W1. By heating the cooling water W1, for example, it is possible to suppress a decrease in the combustion temperature of the combustion facility 2 and to increase the treatment amount of the cooling water.

It is preferable that the $CO_2$ recovery system 100 further includes the reclaiming device 20 that recovers the impurity S0 from the $CO_2$ absorption liquid S1, and the impurity introduction line 10C that is connected to the reclaiming device 20 and the combustion facility 2 and allows the impurity S0 to be introduced into the combustion facility 2. Since the impurity S0 contains the component of the $CO_2$ absorption liquid S1, combusting the impurity S0 in the combustion facility 2 can more suitably suppress the discharge of the $CO_2$ absorption liquid S1 to the outside.

It is preferable that the $CO_2$ recovery system 100 further includes the exhaust gas treatment facility 4 that is provided at a downstream stage of the combustion facility 2 in the flow of the exhaust gas G0 and treats the exhaust gas G0, and the EGR line 4C that connects a side on which the exhaust gas G1 of the exhaust gas treatment facility 4 is discharged and the combustion facility 2 to each other and allows at least a portion of the exhaust gas G1 treated by the exhaust gas treatment facility 4 to be returned to the combustion facility 2, in which the decarbonated gas introduction line 10Aa is connected to the $CO_2$ absorption tower 16 and the EGR line 4C. The EGR line 4C is provided, and the decarbonated gas introduction line 10Aa is connected to the EGR line 4C, so that the mixing of the air inside the combustion facility 2 can be appropriately promoted.

It is preferable that the $CO_2$ recovery system 100 further includes the exhaust gas introduction line 4Ba that connects the EGR line 4C and the $CO_2$ absorption tower 16 to each other and allows at least a portion of the exhaust gas G1 passing through the EGR line 4C to be introduced into the $CO_2$ absorption tower 16. The exhaust gas G1 passing through the EGR line 4C is introduced into the $CO_2$ absorption tower 16 and returned to the combustion facility 2, so that it is possible to appropriately decompose the component of the $CO_2$ absorption liquid S1 while appropriately promoting the mixing of the air in the combustion facility 2.

It is preferable that the decarbonated gas introduction line 10Aa is connected upstream of the air introduction inlet into which the air A for combustion is introduced, in the combustion facility 2, in the gas flow within the combustion facility 2. By providing the decarbonated gas introduction line 10Aa upstream of the air introduction inlet, it is possible to appropriately stir the combustion gas inside the combustion facility 2 and to achieve the decarbonated gas G3 appropriately functioning as a gas for EGR.

The combustion facility 2 is provided with the first air introduction inlet PA1 into which the air A for combustion is introduced, and the second air introduction inlet PA2 that is provided downstream of the first air introduction inlet PA1 in the gas flow within the combustion facility 2 and into which the air A for combustion is introduced. It is preferable that the decarbonated gas introduction line 10Aa is connected upstream of the second air introduction inlet PA2 in the combustion facility 2, in the gas flow within the combustion facility. By providing the decarbonated gas introduction line 10Aa upstream of the second air introduction inlet PA2, it is possible to appropriately stir the combustion gas inside the combustion facility 2 and to achieve the decarbonated gas G3 appropriately functioning as a gas for EGR.

It is preferable that the $CO_2$ recovery system 100 further includes the oxygen supply device 80 that is connected to the combustion facility 2 and introduces oxygen into the combustion facility 2. By supplying the oxygen to the combustion facility 2, the amount of oxygen in the combustion facility 2 is increased, so that it is possible to increase the $CO_2$ concentration in the exhaust gas G0 and to more suitably perform the $CO_2$ recovery.

The $CO_2$ recovery method according to the present disclosure includes a step of generating the exhaust gas G0 containing $CO_2$ by combusting in the combustion facility 2, a step of bringing the exhaust gas G0 discharged from the combustion facility 2 into contact with the $CO_2$ absorption liquid S1 to remove the $CO_2$ from the exhaust gas G0, and a step of introducing at least a portion of the decarbonated gas G3, which is the exhaust gas G0 from which the $CO_2$ has been removed, into the combustion facility 2. In the step of generating the exhaust gas G, the component of the $CO_2$ absorption liquid S1 contained in the decarbonated gas G3 is combusted. In the present disclosure, since the decarbonated gas G3 is introduced into the combustion facility 2, the $CO_2$ absorption liquid S1 entrained in the decarbonated gas G3 is incinerated, so that the discharge of the component of the $CO_2$ absorption liquid S1 to the outside can be suppressed.

Although the embodiments of the present invention have been described above, the embodiments are not limited by the contents of the embodiments. In addition, the above-described components include those that can be easily assumed by those skilled in the art, those that are substantially the same, and those that are within a so-called equivalent range. Further, the above-described components can be combined as appropriate. Furthermore, various omissions, replacements, or modifications of the above-described components can be made without departing from the concept of the above-described embodiments.

REFERENCE SIGNS LIST

2: combustion facility
4: exhaust gas treatment facility
4B: exhaust gas introduction line
10: $CO_2$ recovery apparatus
10A decarbonated gas introduction line
14: exhaust gas cooling device
16: $CO_2$ absorption tower
18: regeneration tower
20: reclaiming device
G0, G1, G2: exhaust gas
G3: decarbonated gas

The invention claimed is:

1. A $CO_2$ recovery system comprising:
a combustion facility;
a $CO_2$ absorption tower that brings an exhaust gas containing $CO_2$, which is discharged from the combustion facility and introduced into the $CO_2$ absorption tower, into contact with a $CO_2$ absorption liquid to remove the $CO_2$ from the exhaust gas; and
a decarbonated gas introduction line that is connected to the $CO_2$ absorption tower and the combustion facility and allows at least a portion of a decarbonated gas, which is the exhaust gas from which the $CO_2$ has been removed in the $CO_2$ absorption tower, to be introduced into the combustion facility.

2. The $CO_2$ recovery system according to claim 1, further comprising:
an adjustment unit that adjusts a flow rate of the exhaust gas to be introduced into the $CO_2$ absorption tower.

3. The $CO_2$ recovery system according to claim 2,
wherein the adjustment unit adjusts the flow rate of the exhaust gas to be introduced into the $CO_2$ absorption tower according to a combustion state in the combustion facility.

4. The $CO_2$ recovery system according to claim 1, further comprising:
a heating section that heats the decarbonated gas before being introduced into the combustion facility.

5. The $CO_2$ recovery system according to claim 4,
wherein the heating section exchanges heat between the exhaust gas before being introduced into the $CO_2$ absorption tower and the decarbonated gas to heat the decarbonated gas.

6. The $CO_2$ recovery system according to claim 4, further comprising:
a steam generation facility that generates steam by heat of the exhaust gas discharged from the combustion facility,
wherein the heating section exchanges heat between the decarbonated gas and the steam to heat the decarbonated gas.

7. The $CO_2$ recovery system according to claim 1, further comprising:
an exhaust gas cooling device that is provided at an upstream stage of the $CO_2$ absorption tower in a flow of the exhaust gas and brings the exhaust gas into contact with cooling water to cool the exhaust gas; and a cooling water introduction line that is connected to the exhaust gas cooling device and the combustion facility and allows the cooling water to be introduced into the combustion facility.

8. The $CO_2$ recovery system according to claim 7, further comprising:

an exhaust gas treatment facility that is provided at a downstream stage of the combustion facility in the flow of the exhaust gas and treats the exhaust gas, wherein the cooling water introduction line is branched into a line that is connected to the exhaust gas cooling device and the combustion facility and that allows the cooling water to be introduced into the combustion facility, and a line that is connected to the exhaust gas cooling device and the exhaust gas treatment facility and that allows the cooling water to be introduced into the exhaust gas treatment facility.

9. The $CO_2$ recovery system according to claim 7, further comprising:

an adjustment unit that adjusts a flow rate of the cooling water to be introduced into the combustion facility according to a combustion state in the combustion facility.

10. The $CO_2$ recovery system according to claim 1, further comprising:

a temperature-reducing tower that is provided at a downstream stage of the combustion facility in a flow of the exhaust gas and cools the exhaust gas;

an exhaust gas cooling device that is provided between the temperature-reducing tower and the $CO_2$ absorption tower in the flow of the exhaust gas and brings the exhaust gas after being cooled by the temperature-reducing tower into contact with cooling water to cool the exhaust gas; and a cooling water introduction line that is connected to the exhaust gas cooling device and the temperature-reducing tower and allows the cooling water to be introduced into the temperature-reducing tower.

11. The $CO_2$ recovery system according to claim 10, further comprising:

an adjustment unit that adjusts a flow rate of the cooling water to be introduced into the temperature-reducing tower according to a flow rate of the exhaust gas to be introduced into the temperature-reducing tower.

12. The $CO_2$ recovery system according to claim 7, wherein a buffer tank that stores the cooling water corresponding to an increased flow rate in the exhaust gas cooling device is provided on the cooling water introduction line.

13. The $CO_2$ recovery system according to claim 7, further comprising:

a heating section that heats the cooling water led out from the exhaust gas cooling device.

14. The $CO_2$ recovery system according to claim 13, wherein the heating section exchanges heat between the exhaust gas before being introduced into the exhaust gas cooling device and the cooling water to heat the cooling water.

15. The $CO_2$ recovery system according to claim 13, further comprising:

a steam generation facility that generates steam by heat of the exhaust gas discharged from the combustion facility, wherein the heating section exchanges heat between the cooling water and the steam to heat the cooling water.

16. The $CO_2$ recovery system according to claim 13, wherein the heating section transfers heat of the exhaust gas passing through an exhaust gas introduction line, which connects the combustion facility and the exhaust gas cooling device to each other, to the cooling water to heat the cooling water.

17. The $CO_2$ recovery system according to claim 1, further comprising:

a reclaiming device that recovers an impurity from the $CO_2$ absorption liquid; and an impurity introduction line that is connected to the reclaiming device and the combustion facility and allows the impurity to be introduced into the combustion facility.

18. The $CO_2$ recovery system according to claim 1, further comprising:

an exhaust gas treatment facility that is provided at a downstream stage of the combustion facility in a flow of the exhaust gas and treats the exhaust gas; and an EGR line that connects a side on which the exhaust gas of the exhaust gas treatment facility is discharged and the combustion facility to each other and allows at least a portion of the exhaust gas treated by the exhaust gas treatment facility to be returned to the combustion facility, wherein the decarbonated gas introduction line is connected to the $CO_2$ absorption tower and the EGR line.

19. The $CO_2$ recovery system according to claim 18, further comprising:

an exhaust gas introduction line that connects the EGR line and the $CO_2$ absorption tower to each other and allows at least a portion of the exhaust gas passing through the EGR line to be introduced into the $CO_2$ absorption tower.

20. The $CO_2$ recovery system according to claim 1, wherein the decarbonated gas introduction line is connected upstream of an air introduction inlet into which air for combustion is introduced, in the combustion facility, in a gas flow within the combustion facility.

21. The $CO_2$ recovery system according to claim 20, wherein the combustion facility is provided with a first air introduction inlet into which air for combustion is introduced, and a second air introduction inlet that is provided downstream of the first air introduction inlet in the gas flow within the combustion facility and into which air for combustion is introduced, and the decarbonated gas introduction line is connected upstream of the second air introduction inlet in the combustion facility, in the gas flow within the combustion facility.

22. The $CO_2$ recovery system according to claim 1, further comprising:

an oxygen supply device that is connected to the combustion facility and introduces oxygen into the combustion facility.

23. A $CO_2$ recovery method comprising:

generating an exhaust gas containing $CO_2$ by combusting in a combustion facility;

bringing the exhaust gas discharged from the combustion facility into contact with a $CO_2$ absorption liquid to remove the $CO_2$ from the exhaust gas; and introducing at least a portion of a decarbonated gas, which is the exhaust gas from which the $CO_2$ has been removed, into the combustion facility.

* * * * *